(12) United States Patent
Yamazaki et al.

(10) Patent No.: US 6,400,998 B1
(45) Date of Patent: Jun. 4, 2002

(54) GENERATION OF MEASUREMENT PROGRAM IN NC MACHINING AND MACHINING MANAGEMENT BASED ON THE MEASUREMENT PROGRAM

(75) Inventors: Kazuo Yamazaki, 44204 Greenview Dr., El Macero, CA (US) 95618; Sadayuki Matsumiya, Kawasaki (JP); Naoki Morita, Yamatokoriyama (JP); Yasushi Fukaya, Aichi (JP)

(73) Assignees: Mitutoyo Corporation, Kanagawa; Kabushiki Kaisha Mori Seiki Seisakusho, Nara; Okuma Corporation, Aichi, all of (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/101,196

(22) PCT Filed: Nov. 7, 1996

(86) PCT No.: PCT/JP96/03265

§ 371 (c)(1),
(2), (4) Date: Jul. 2, 1998

(87) PCT Pub. No.: WO98/19821

PCT Pub. Date: May 14, 1998

(51) Int. Cl.[7] .......................... G06B 15/00; G06B 19/00
(52) U.S. Cl. .......................... 700/86; 700/18; 700/173; 700/181; 700/183; 700/251; 700/253; 318/568.1; 318/568.23; 318/568.15; 318/569; 451/5; 451/9; 901/3; 901/6; 33/1 M; 33/503; 33/505; 33/626
(58) Field of Search .......................... 700/178, 195, 700/52, 61–64, 97–98, 112, 108, 118, 163–174, 86–89, 250–257, 25, 18–23, 247–264; 318/568.1, 568.19, 568.23, 568.15, 568.11, 563–567, 632, 569, 570–572; 901/6, 3; 82/118–120; 451/5–6, 8–10; 33/1 M, 503, 505, 626

(56) References Cited

U.S. PATENT DOCUMENTS

| | | | | |
|---|---|---|---|---|
| 4,569,014 A | * | 2/1986 | Kishi et al. | 700/18 |
| 4,912,644 A | * | 3/1990 | Aoyama et al. | 700/98 |
| 4,974,165 A | * | 11/1990 | Locke et al. | 700/195 |
| 5,288,209 A | * | 2/1994 | Therrien et al. | 416/193 |
| 5,307,282 A | * | 4/1994 | Conradson et al. | 700/191 |
| 5,315,522 A | * | 5/1994 | Kauffman et al. | 700/191 |
| 5,396,265 A | * | 3/1995 | Ulrich et al. | 345/158 |
| 5,434,791 A | * | 7/1995 | Koko et al. | 700/191 |
| 5,485,390 A | * | 1/1996 | LeClair et al. | 700/191 |
| 5,497,315 A | * | 3/1996 | Sugiura et al. | 700/86 |
| 5,551,028 A | * | 8/1996 | Voll et al. | 700/98 |
| 5,587,914 A | * | 12/1996 | Conradson et al. | 700/98 |
| 5,815,400 A | * | 9/1998 | Hirai et al. | 700/181 |

FOREIGN PATENT DOCUMENTS

| | | |
|---|---|---|
| JP | A-61-230842 | 4/1985 |
| JP | A-2-23406 | 11/1988 |
| JP | A-4-25346 | 5/1990 |
| JP | A-5-307407 | 4/1992 |
| JP | A-6-161533 | 11/1992 |

* cited by examiner

*Primary Examiner*—Ramesh Patel
(74) *Attorney, Agent, or Firm*—Oliff & Berridge, PLC

(57) ABSTRACT

A method and apparatus for NC machining management based on a measurement program, wherein a machining shape at an arbitrary machining stage is determined by an NC program, a geometric element or a geometric model is generated, and a measurement program is generated on the basis of the geometric model. The measurement program is executed when at least one of the steps of the NC program is completed, and the results of measurement are used as control information for machining measurement.

10 Claims, 35 Drawing Sheets

Fig. 4A

NC PROGRAM SAMPLE

| | | | |
|---|---|---|---|
| 1 | O 0001 | 33 | N2(CENTER DRILL) |
| 2 | G90 G80 G40 | 34 | G90 G54 G0 X70. Y50. S1000 M3 T3 |
| 3 | G91 G28 Z0 | 35 | G43 Z50. H2 M8 |
| 4 | T1 | 36 | G99 G81 Z-3. R2. F100 |
| 5 | M6 | 37 | X-70. |
| 6 | N1(FACE MILL 100mm DIA.) | 38 | Y-50. |
| 7 | G90 G54 G0 X160.Y50. S400 M3 T2 | 39 | X70. |
| 8 | G43 Z50. H1 M8 | 40 | X30.Y0 |
| 9 | G1 Z.1 F2000 | 41 | G0 Z100. |
| 10 | X-160. F250 | 42 | G90 G55 G0 X40. Y0 |
| 11 | G0 Y-45. | 43 | Z50. |
| 12 | G1 X160. | 44 | G99 G81 Z-3. R2. F100 |
| 13 | G0 Y50. S600 | 45 | X-40. |
| 14 | G1 Z0 | 46 | G0 Z50. M9 |
| 15 | X-160. F400 | 47 | G91 G28 Z0 M6 |
| 16 | G0 Y-45. | 48 | M1 |
| 17 | G1 X160. | | |
| 18 | G0 Z100. | 49 | N3(DRILL 20mm DIA.) |
| 19 | G55 G0 X160. Y50. S400 | 50 | G90 G54 G0 X70. Y50. S400 M3 T4 |
| 20 | Z50. | 51 | G43 Z50. H3 M8 |
| 21 | G1 Z.1 F2000 | 52 | G99 G81 Z-25. R2. F80 |
| 22 | X-160. F250 | 53 | X-70. |
| 23 | G0 Y-45. | 54 | Y-50. |
| 24 | G1 X160. | 55 | X70 |
| 25 | G0 Y50. S600 | 56 | G0 Z50. M9 |
| 26 | G1 Z0 | 57 | G91 G28 Z0 M6 |
| 27 | X-160. F400 | 58 | M1 |
| 28 | G0 Y-45. | | |
| 29 | G1 X160. | 59 | N4(DRILL 30mm DIA.) |
| 30 | G0 Z50. M9 | 60 | G90 G54 G0 X30. Y0 S300 M3 T5 |
| 31 | G91 G28 Z0 M6 | 61 | G43 Z100. H4 M8 |
| 32 | M1 | 62 | G98 G81 Z-19.9 R2,F60 |
| | | 63 | G55 G0 X40.Y0 |
| | | 64 | Z50. |
| | | 65 | G99 G81 Z-21. R2. F60 |
| | | 66 | X-40 |

Fig. 4B

| | | | |
|---|---|---|---|
| 67 | G0 Z50. M9 | 101 | G43 Z50. H6 M8 |
| 68 | G91 G28 Z0 M6 | 102 | G1 Z-19. F2000 |
| 69 | M1 | 103 | Z-20. F50 |
| | | 104 | G41 Y20. D6 |
| 70 | N5(END MILL 25mm DIA ROUGH) | 105 | G1 X-30. |
| 71 | G90 G54 G0 X30. Y0 S350 M3 T6 | 106 | G3 Y-20. R20. |
| 72 | G43 Z50. H5 M8 | 107 | G1 X30. |
| 73 | G1 Z-10. F2000 | 108 | G2 Y20. R20. |
| 74 | Z-19.9 F35 | 109 | G40 G1 Y0 F200 |
| 75 | G41 X-50. F50 D5 | 110 | G0 Z50. M9 |
| 76 | G3 X-30. Y-20. R20. | 111 | G91 G28 Z0 M6 |
| 77 | G1 X30. | 112 | M1 |
| 78 | G3 Y20. R20. | | |
| 79 | G1 X-30. | 113 | N7(DRILL 8.2mm) |
| 80 | G3 X-50. Y0 R20. | 114 | G90 G55 G0 X40. Y0 S1000 M3 T8 |
| 81 | G40 G1 X-30. F200 | 115 | G43 Z50. H7 M8 |
| 82 | G0 Z100. | 116 | G98 G81 Z-45. R-19. F150 |
| 83 | G55 G0 X40. Y0 | 117 | X-40. |
| 84 | G1 Z-10. F2000 | 118 | G0 Z50. M9 |
| 85 | Z-20. F35 | 119 | G91 G28 Z0 M6 |
| 86 | G41 X20. D15 | 120 | M1 |
| 87 | G3 I20. F50 | | |
| 88 | G40 G1 X40. | 121 | N8(CHAMFER 25mm DIA.) |
| 89 | G0 Z10. | 122 | G90 G54 G0 X70. Y50. S500 M3 T9 |
| 90 | G0 X-40. | 123 | G43 Z10. H8 M8 |
| 91 | G1 Z-10. F2000 | 124 | G98 G81 Z-11. R-8. F50 |
| 92 | Z-20. F35 | 125 | X-70. |
| 93 | G41 X-60. D15 | 126 | Y-50. |
| 94 | G3 I20. F50 | 127 | X70. |
| 95 | G40 G1 X-40. | 128 | G0 Z100. |
| 96 | G0 Z10. M9 | 129 | G55 G0 X40. Y0 S800 |
| 97 | G91 G28 Z0 M6 | 130 | Z10. |
| 98 | M1 | 131 | G98 G81 Z-25. R-22. F80 |
| | | 132 | X-40. |
| 99 | N6(END MILL 25mm DIA FINISH) | 133 | G0 Z50. M9 |
| 100 | G90 G54 G0 X30. Y0 S500 M3 T7 | 134 | G91 G28 Z0 M6 |

136 N9(TAP M10 P1.25)
137 G90 G55 G0 X40. Y0 T1
138 G43 Z10. H9 M8
139 M29 S320
140 G98 G84 Z-40. R-10. F400
141     X-40.
142 G0 Z50. M9
143 G91 G28 Y0 Z0 M6
144 M30

Fig. 7

O0001 TOOL LIST

| TOOL NAME | MAKER | HOLDER TYPE NO. | CHIP TYPE NO. | CHIP MATERIAL | NOMINAL DIAMETER | T CODE | H CODE | D CODE | NO. OF TOOTH | FLUTE LENGTH | TOOL LENGTH | PITCH | ANGLE |
|---|---|---|---|---|---|---|---|---|---|---|---|---|---|
| FACE MILLING CUTTER | ABC CO. | A-01 | B-01 | HARD METAL | 100.000 | 1 | 1 | 1 | 6 | 10.000 | 20.000 | – | 90 |
| CENTER DRILL | ABC CO. | A-02 | B-02 | HIGH SPEED STEEL | 3.000 | 2 | 2 | 2 | – | 5.000 | 20.000 | – | 60 |
| DRILL | ABC CO. | A-03 | B-03 | HIGH SPEED STEEL | 20.000 | 3 | 3 | 3 | – | 150.000 | 160.000 | – | 118 |
| DRILL | ABC CO. | A-04 | B-04 | HIGH SPEED STEEL | 30.000 | 4 | 4 | 4 | – | 150.000 | 160.000 | – | 118 |
| END MILL | ABC CO. | A-05 | B-05 | HIGH SPEED STEEL | 25.000 | 5 | 5 | 5 | 2 | 50.000 | 50.000 | – | – |
| END MILL | ABC CO. | A-06 | B-06 | HIGH SPEED STEEL | 25.000 | 6 | 6 | 6 | 2 | 35.000 | 50.000 | – | – |
| DRILL | ABC CO. | A-07 | B-07 | HIGH SPEED STEEL | 8.200 | 7 | 7 | 7 | – | 50.000 | 100.000 | – | 118 |
| CHAMFER | ABC CO. | A-08 | B-08 | HIGH SPEED STEEL | 25.000 | 8 | 8 | 8 | 2 | 10.000 | 80.000 | – | 45 |
| TAP | ABC CO. | A-09 | B-09 | HIGH SPEED STEEL | M10 | 9 | 9 | 9 | – | 30.000 | 50.000 | 1.25 | 45 |

Fig. 8A

G CORD DEVELOPMENT LIST

NT = Next Tool  ST = Spindle Tool  WK = WORK COORDINATE SYSTEM

| LINE NUMBER | O | N | NT | ST | WK | X COORDINATE VALUE | Y COORDINATE VALUE | Z COORDINATE VALUE | S | M | F | AXIS | INTERPO-LATION | R | I | J | G80 | G98 | R POINT | G40 | G43 | H CODED | CODE |
|---|---|---|---|---|---|---|---|---|---|---|---|---|---|---|---|---|---|---|---|---|---|---|---|
| 1 | 1 | | | | | | | | | | | | | | | | | | | | | | |
| 2 | | | | | | | | | | | | | | | | | | | | | | | |
| 3 | | | | | | | | FIRST ORIGIN | | | | | – | | | | | | | | | | |
| 4 | | | 1 | | | | | | | | | | – | | | | | | | | | | |
| 5 | | | | 1 | | | | | | | | | – | | | | | | | | | | |
| 6 | | 1 | | | | | | | | 6 | | | – | | | | | | | | | | |
| 7 | | | 2 | | 54 | 160.000 | 50.000 | | 400 | 3 | | Z | G0 | | | | | | | | | | |
| 8 | | | | | | | | 50.000 | | 8 | | Z | G0 | | | | 80 | | | 40 | | | |
| 9 | | | | | | | | 0.100 | | | | Z | G0 | | | | | | | | 43 | 1 | |
| 10 | | | | | | −160.000 | | | | | 2000 | | – | | | | | | | | | | |
| 11 | | | | | | | −45.000 | | | | 250 | X | G1 | | | | | | | | | | |
| 12 | | | | | | 160.000 | | | 600 | | | Y | G1 | | | | | | | | | | |
| 13 | | | | | | | 50.000 | | | | | X | G0 | | | | | | | | | | |
| 14 | | | | | | | | 0.000 | | | | Y | G0 | | | | | | | | | | |
| 15 | | | | | | −160.000 | | | | | 400 | Z | G1 | | | | | | | | | | |
| 16 | | | | | | | −45.000 | | | | | X | G1 | | | | | | | | | | |
| 17 | | | | | | 160.000 | | | | | | Y | G0 | | | | | | | | | | |
| 18 | | | | | | | 50.000 | | | | | X | G0 | | | | | | | | | | |
| 19 | | | | 55 | | 160.000 | 50.000 | 100.000 | 400 | | 2000 | XY | G0 | | | | | | | | | | |
| 20 | | | | | | | | 50.000 | | | | Z | G0 | | | | | | | | | | |
| 21 | | | | | | | | 0.100 | | | 250 | Z | G0 | | | | | | | | | | |
| 22 | | | | | | −160.000 | | | | | | X | G1 | | | | | | | | | | |
| 23 | | | | | | | −45.000 | | | | | Y | G1 | | | | | | | | | | |
| 24 | | | | | | 160.000 | | | | | 400 | X | G0 | | | | | | | | | | |
| 25 | | | | | | | 50.000 | | | | | Y | G0 | | | | | | | | | | |
| 26 | | | | | | | | 0.000 | | | | Z | G1 | | | | | | | | | | |
| 27 | | | | | | −160.000 | | | | | | X | G1 | | | | | | | | | | |
| 28 | | | | | | | −45.000 | | | | | Y | G0 | | | | | | | | | | |
| 29 | | | | | | 160.000 | | | | 9 | | X | G1 | | | | | | | | | | |
| 30 | | | | | | | | 50.000 | | 6 | | Z | G0 | | | | | | | | | | |
| 31 | | | | 2 | | | | FIRST ORIGIN | | | | Z | G0 | | | | | | | | | | |

Fig. 8B

| LINE NUMBER | O | N | NT | ST | WK | X COORDINATE VALUE | Y COORDINATE VALUE | Z COORDINATE VALUE | S | M | F | AXIS | INTERPOLATION | R | J | K | G80 | G98 | R POINT | G40 | G43 | H | CODED CODE |
|---|---|---|---|---|---|---|---|---|---|---|---|---|---|---|---|---|---|---|---|---|---|---|---|
| 32 | | | | | | | | | | 1 | | | | | | | | | | | | | |
| 33 | | 2 | | | | | | | | | | | | | | | | | | | | | |
| 34 | | | 3 | | 54 | 70.000 | 50.000 | | #### | 3 | | XY | G0 | | | | | | | | 43 | | 2 |
| 35 | | | | | | | | 50.000 | | 8 | | Z | G0 | | | | 81 | 99 | 2.000 | | | | |
| 36 | | | | | | | | -3.000 | | | 100 | Z | | | | | | | | | | | |
| 37 | | | | | | -70.000 | | | | | | Z | | | | | | | | | | | |
| 38 | | | | | | | -50.000 | | | | | Z | | | | | | | | | | | |
| 39 | | | | | | 70.000 | 0.000 | | | | | Z | | | | | | | | | | | |
| 40 | | | | | | 30.000 | | 100.000 | | | | Z | G0 | | | | | | | | | | |
| 41 | | | | | 55 | 40.000 | 0.000 | | | | | XY | G0 | | | | | | | | | | |
| 42 | | | | | | | | 50.000 | | | | Z | G0 | | | | | | | | | | |
| 43 | | | | | | | | -3.000 | | | 100 | Z | | | | | | | | | | | |
| 44 | | | | | | -40.000 | | | | | | Z | | | | | | | | | | | |
| 45 | | | | | | | | 50.000 | | | | Z | G0 | | | | 81 | 99 | 2.000 | | | | |
| 46 | | | | | | | | FIRST ORIGIN | | 9 | | Z | G0 | | | | | | | | | | |
| 47 | | | 3 | | | | | | | 6 | | Z | G0 | | | | | | | | | | |
| 48 | | | | | | | | | | 1 | | | | | | | | | | | | | |
| 49 | | 3 | | | | | | | | | | | | | | | | | | | | | |
| 50 | | | 4 | | 54 | 70.000 | 50.000 | | 400 | 3 | | XY | G0 | | | | | | | | | | |
| 51 | | | | | | | | 50.000 | | 8 | | Z | G0 | | | | 81 | 99 | 2.000 | | 43 | | 3 |
| 52 | | | | | | | | -25.000 | | | 80 | Z | | | | | | | | | | | |
| 53 | | | | | | -70.000 | | | | | | Z | | | | | | | | | | | |
| 54 | | | | | | | -50.000 | | | | | Z | | | | | | | | | | | |
| 55 | | | | | | 70.000 | | | | | | Z | | | | | | | | | | | |
| 56 | | | | | | | | 50.000 | | 9 | | Z | G0 | | | | | | | | | | |
| 57 | | | 4 | | | | | FIRST ORIGIN | | 6 | | Z | G0 | | | | | | | | | | |
| 58 | | | | | | | | | | 1 | | | | | | | | | | | | | |
| 59 | | 4 | | | | | | | | | | | | | | | | | | | | | |
| 60 | | | 5 | | 54 | 30.000 | 0.000 | | 300 | 3 | | XY | G0 | | | | | | | | | | |
| 61 | | | | | | | | 100.000 | | 8 | | Z | G0 | | | | 81 | 98 | 2.000 | | 43 | | 4 |
| 62 | | | | | | | | -19.900 | | | 60 | Z | | | | | | | | | | | |
| 63 | | | | | 55 | 40.000 | 0.000 | | | | | XY | G0 | | | | | | | | | | |
| 64 | | | | | | | | 50.000 | | | | Z | G0 | | | | 81 | 99 | 2.000 | | | | |
| 65 | | | | | | | | -21.000 | | | 60 | Z | | | | | | | | | | | |
| 66 | | | | | | -40.000 | | | | | | | | | | | | | | | | | |

Fig. 8C

| LINE NUMBER | O | N | NT | ST | WK | X COORDINATE VALUE | Y COORDINATE VALUE | Z COORDINATE VALUE | S | M | F | AXIS | INTERPO-LATION | R | I | J | G80 | G98 | R POINT | G40 | G43 | H CODED CODE |
|---|---|---|---|---|---|---|---|---|---|---|---|---|---|---|---|---|---|---|---|---|---|---|
| 67 | | | | | | | | 50.000 | | 9 | | Z | G0 | | | | | | | | | |
| 68 | | | | 5 | | | | FIRST ORIGIN | | 6 | | Z | G0 | | | | | | | | | |
| 69 | | | | | | | | | | 1 | | – | – | | | | | | | | | |
| 70 | | 5 | | | | | | | | | | – | – | | | | | | | | | |
| 71 | | | 6 | | 54 | 30.000 | 0.000 | | 350 | 3 | | XY | G0 | | | | | | | | | |
| 72 | | | | | | | | 50.000 | | 8 | | Z | G0 | | | | | | | 41 | 43 | 5 | 5 |
| 73 | | | | | | | | -10.000 | | | 2000 | Z | G1 | | | | | | | | | |
| 74 | | | | | | | | -19.900 | | | 35 | Z | G1 | | | | | | | | | |
| 75 | | | | | | -50.000 | | | | | 50 | X | G1 | | | | | | | | | |
| 76 | | | | | | -30.000 | -20.000 | | | | | XY | G3 | 20.000 | | | | | | | | |
| 77 | | | | | | 30.000 | | | | | | X | G1 | | | | | | | | | |
| 78 | | | | | | | 20.000 | | | | | Y | G3 | 20.000 | | | | | | | | |
| 79 | | | | | | -30.000 | 0.000 | | | | | X | G1 | | | | | | | 40 | | |
| 80 | | | | | | -50.000 | | | | | | X | G1 | | | | | | | | | |
| 81 | | | | | | -30.000 | | | | | 200 | XY | G3 | 20.000 | | | | | | | | |
| 82 | | | | | | | | 100.000 | | | | X | G0 | | | | | | | | | |
| 83 | | | | | 55 | 40.000 | 0.000 | | | | | Z | G0 | | | | | | | | | |
| 84 | | | | | | | | -10.000 | | | 2000 | XY | G0 | | | | | | | | | |
| 85 | | | | | | | | -20.000 | | | 35 | Z | G1 | | | | | | | | | |
| 86 | | | | | | 20.000 | | | | | | Z | G1 | | | | | | | | | |
| 87 | | | | | | | | | | | 50 | XY | G3 | | 20.000 | | | | | 41 | | |
| 88 | | | | | | 40.000 | | 10.000 | | | | X | G1 | | | | | | | 40 | | |
| 89 | | | | | | | | | | | | Z | G0 | | | | | | | | | |
| 90 | | | | | | -40.000 | | | | | | XY | G0 | | | | | | | | | |
| 91 | | | | | | | | -10.000 | | | 2000 | Z | G1 | | | | | | | | | |
| 92 | | | | | | | | -20.000 | | | 35 | Z | G1 | | | | | | | | | |
| 93 | | | | | | -60.000 | | | | | | X | G1 | | | | | | | | | |
| 94 | | | | | | | | | | | 50 | XY | G3 | | 20.000 | | | | | 41 | 43 | 15 | 15 |
| 95 | | | | | | -40.000 | | 10.000 | | 9 | | X | G1 | | | | | | | 40 | | |
| 96 | | | | 6 | | | | FIRST ORIGIN | | 6 | | Z | G0 | | | | | | | | | |
| 97 | | | | | | | | | | 1 | | – | – | | | | | | | | | |
| 98 | | | | | | | | | | | | – | – | | | | | | | | | |
| 99 | | 6 | | | | | | | | | | – | – | | | | | | | | | |
| 100 | | | 7 | | 54 | 30.000 | 0.000 | | 500 | 3 | | XY | G0 | | | | | | | | 43 | 6 |
| 101 | | | | | | | | 50.000 | | 8 | | Z | G0 | | | | | | | | | |

Fig. 8D

| LINE NUMBER | O | N | NT | ST | WK | X COORDINATE VALUE | Y COORDINATE VALUE | Z COORDINATE VALUE | S | M | F | AXIS | INTERPOLATION | R | I | J | G80 | G98 | R POINT | G40 | G43 | H | CODED CODE |
|---|---|---|---|---|---|---|---|---|---|---|---|---|---|---|---|---|---|---|---|---|---|---|---|
| 102 | | | | | | | | -19.000 | | | 2000 | Z | G1 | | | | | | | | | | |
| 103 | | | | | | | | -20.000 | | | 50 | Z | G1 | | | | | | | | | | |
| 104 | | | | | | | 20.000 | | | | | Y | G1 | | | | | | | | | | |
| 105 | | | | | | -30.000 | | | | | | X | G1 | | | | | | | | | | 6 |
| 106 | | | | | | | -20.000 | | | | | XY | G3 | 20.000 | | | | | | | | | |
| 107 | | | | | | 30.000 | | | | | | X | G1 | | | | | | | | | | |
| 108 | | | | | | | 20.000 | | | | | XY | G3 | 20.000 | | | | | | | | | |
| 109 | | | | | | | 0.000 | | | 9 | | Y | G1 | | | | | | | | | | |
| 110 | | | | | | | | 50.000 | | 6 | | Z | G0 | | | | | | | | | | |
| 111 | | | | | | | | FIRST ORIGIN | | 1 | | | | | | | | | | | | | |
| 112 | | | | | | | | | | | | | | | | | | | | | | | |
| 113 | | 7 | | | | | | | | | | | | | | | | | | | | | | |
| 114 | | 8 | 8 | | 55 | 40.000 | 0.000 | 0.000 | #### | 3 | | XY | G0 | | | | | | | | | | |
| 115 | | | | | | | | 50.000 | | 8 | | Z | G0 | | | | | | | | | | |
| 116 | | | | | | -40.000 | | -45.000 | | | 150 | | | | | | 81 | 98 | -19.0 | 41 | 43 | 7 | |
| 117 | | | | | | | | | | | | | | | | | | | | | | | | |
| 118 | | | | | | | | 50.000 | | 9 | | Z | G0 | | | | | | | | | | |
| 119 | | | 8 | | | | | FIRST ORIGIN | | 6 | | Z | G0 | | | | | | | | | | |
| 120 | | | | | | | | | | 1 | | | | | | | | | | | | | |
| 121 | | | | | | | | | | | | | - | - | | | | | | | | | | |
| 122 | | 8 | | | 54 | 70.000 | 50.000 | | 500 | 3 | | XY | G0 | | | | | | | | | | |
| 123 | | | | | | | | 10.000 | | 8 | 50 | Z | G0 | | | | 81 | 98 | -8.0 | 40 | 43 | 8 | |
| 124 | | | | | | -70.000 | | -11.000 | | | | | | | | | | | | | | | | |
| 125 | | | | | | | | | | | | | | | | | | | | | | | | |
| 126 | | | | | | | -50.000 | | | | | | | | | | | | | | | | | |
| 127 | | | | | | 70.000 | | 100.000 | | | | | | | | | | | | | | | | |
| 128 | | | | | | | | | 800 | | | | | | | | | | | | | | | |
| 129 | | 9 | | | 55 | 40.000 | 0.000 | 10.000 | | | | Z | G0 | | | | | | | | | | |
| 130 | | | | | | | | -25.000 | | | 80 | XY | G0 | | | | | | | | | | |
| 131 | | | | | | -40.000 | | | | | | Z | G0 | | | | 81 | 98 | -22.0 | | | | |
| 132 | | | | | | | | 50.000 | | 9 | | Z | G0 | | | | | | | | | | |
| 133 | | | 9 | | | | | FIRST ORIGIN | | 6 | | Z | G0 | | | | | | | | | | |
| 134 | | | | | | | | | | 1 | | | | | | | | | | | | | |
| 135 | | | | | | | | | | | | - | - | | | | | | | | | | |
| 136 | | 9 | | | | | | | | | | - | - | | | | | | | | | | |

Fig. 8E

| LINE NUMBER | O | N | NT | ST | WK | X COORDINATE VALUE | Y COORDINATE VALUE | Z COORDINATE VALUE | S | M | F | AXIS | INTERPOLATION | R | I | J | G80 | G98 | R POINT | G40 | G43 | H CODED CODE |
|---|---|---|---|---|---|---|---|---|---|---|---|---|---|---|---|---|---|---|---|---|---|---|
| 137 |   |   | 1 |   | 55 | 40.000 | 0.000 |   |   |   |   | XY | G0 |   |   |   |   |   |   |   |   |   |
| 138 |   |   |   |   |   |   |   | 10.000 |   | 8 |   | Z | G0 |   |   |   |   |   |   |   |   |   |
| 139 |   |   |   |   |   |   |   |   | 320 | 29 |   |   |   |   |   |   |   |   |   |   |   |   |
| 140 |   |   |   |   |   |   |   | -40.000 |   |   | 400 |   |   |   |   |   |   |   |   |   |   |   |
| 141 |   |   |   |   |   | -40.000 |   |   |   |   |   |   |   |   |   |   | 84 | 98 | -10.0 |   | 43 | 9 |
| 142 |   |   |   |   |   |   |   | 50.000 |   | 9 |   | Z | G0 |   |   |   |   |   |   |   |   |   |
| 143 |   |   |   | 1 |   |   |   | FIRST ORIGIN |   | 6 |   | Z | G0 |   |   |   |   |   |   |   |   |   |

Fig. 9

DEFINITION OF OPERATION ELEMENTS AND TOOLS TO BE USED IN MACHINING ELEMENTS

| MACHINING ELMENTS | OPERATION ELEMENTS | TOOLS | PROGRAM ANALYZING METHODS |
|---|---|---|---|
| SURFACE | MILLING, ROUGH | FACE MILLING CUTTER | RECOGNIZE BY T CODE IN TOOL LIST |
| SURFACE | MILLING, FINISH | FACE MILLING CUTTER | |
| POCKET | POCKET, ROUGH | END MILL | RECOGNIZE BY T CODE IN TOOL LIST |
| POCKET | POCKET, FINISH | END MILL | |
| CORE | CORE, ROUGH | END MILL | RECOGINIZE BY T CODE IN TOOL LIST |
| CORE | CORE, FINISH | END MILL | |
| SLOT | SLOT, ROUGH | END MILL | RECOGNIZE BY T CODE IN TOOL LIST, CUT AT LEAST ONCE USING BOTH UP AND DOWN CUT MILLINGS |
| SLOT | SLOT, FIHISH | END MILL | |
| HOLE | CENTER HOLE | CENTER DRILL | RECOGNIZE BY T CODE IN TOOL LIST, CUT ONLY IN Z DIRECTION |
| HOLE | CENTER HOLE | CENTER DRILL | RECOGNIZE BY T CODE IN TOOL LIST, DEEP HOLE DRILLED LATER AT THE SAME COORDINATES |
| HOLE | CENTER CHAMFER | CHAMFER | RECOGNIZE BY T CODE IN TOOL LIST, THE SAME COORDINATES NOT MACHINED BY CENTER DRILL |
| HOLE | DRILL | DRILL | RECOGNIZE BY T CODE IN TOOL LIST, EXCEPT CENTER HOLE DRILL |
| HOLE | CHAMFER | CHMFER | RECOGNIZE BY T CODE IN TOOL LIST, DEEP HOLE DRILLED AT THE SAME CORDINATES |
| HOLE | CHAMFER | DRILL | RECOGNIZE BY T CODE IN TOOL LIST, DEEP HOLE DRILLED AT THE SAME COORDINATES |
| HOLE | END MILL | END MILL | RECOGNIZE BY T CODE IN TOOL LIST, CUT ONLY IN Z DIRECTION |
| HOLE | TAP | TAP | RECOGNIZE BY T CODE IN TOOL LIST |
| HOLE | BORING, ROUGH | BORING | RECOGNIZE BY T CODE IN TOOL LIST |
| HOLE | BORING, FINISH | BORING | RECOGNIZE BY T CODE IN TOOL LIST, RISE AFTER WITHDRAWAL WHEN CUTTING FINISHED |

Fig. 10

OPERATION ELEMENT LIST

| OPERATION ELEMENT NO. | OPERATION ELEMENT NAME |
|---|---|
| 1 | MILLING, ROUGH |
| 2 | MILLING, FINISH |
| 3 | POCKET, ROUGH |
| 4 | POCKET, FINISH |
| 5 | CORE, ROUGH |
| 6 | CORE, FINISH |
| 7 | SLOT, ROUGH |
| 8 | SLOT, FINISH |
| 9 | CENTER HOLE |
| 10 | DRILL |
| 11 | TAP |
| 12 | BORE |
| 13 | CHAMFER |

Fig. 11

DEFINITION OF GENERAL MACHINING PATTERNS IN MACHINING ELEMENTS

| MACHINING ELEMENTS | MACHINING PATTERN |
|---|---|
| SURFACE | TOOLS TO BE USED : FACE MILLING CUTTER, AND MILL |
| | • NO INTERFERENCE BETWEEN WORK AND TOOL AT APPROACH POINT (POINT OF FIRST XY MOVEMENT IN CUTTING FEED) [JUDGMENT 1]<br>• NO INTERFERENCE BETWEEN WORK AND TOOL AT WITHDRAWAL POINT (POINT OF CHANGE FROM CUTTING FEED TO RAPID TRAVERSE) [JUDGMENT 1]<br>• CUT AREA COVERS ENTIRE WORK [JUDGMENT 2]<br>• ONLY ONE CUT DIRECTION (CUT BY MOVEMENT ALONG EITHER X OR Y AXIS) [JUDGMENT 3] |
| POCKET | TOOL TO BE USED : END MILL |
| | • CLOSED PATH OF TOOL DURING ASCENT AFTER DESCENT TO SURFACE TO BE CUT [JUDGMENT 4]<br>• CUT AREA NOT PROTRUDING WORK AREA [JUDGMENT 5]<br>• IN FIRST CLOSED PATH AFTER DESCENT TO MACHINING SURFACE, NO RESIDUAL STOCK REMOVAL ON XY SURFACE (IN HELICAL CUT, NO RESIDUAL STOCK REMOVAL ON XY SURFACE) [JUDGMENT 6]<br>• CUT AREA NOT PROTRUDE WORK [JUDGMENT 7] |
| CORE | TOOL TO BE USED : END MILL |
| | • CUT AREA INTERSECTS WORK AREA [JUDGMENT 8] |
| SLOT | TOOL TO BE USED : END MILL |
| | • CUT IN ONE SURFACE, FINAL TWO CUT SHAPES CREATED BY CUTTING ARE PARALLEL OR SIMILAR [JUDGMENT 9] |
| HOLE | TOOL TO BE USED : CNETER DRILL, DRILL, TAP, REAMER, BORING, END MILL, CHAMFER, ANGLE MILLING CUTTER |
| | • USE FIXED DRILLING CYCLE [JUDGMENT 10]<br>• CUT IN ONLY Z DIRECTION [JUDGMENT 11]<br>• CUT THE SAME COORDINATES WITH ANOTHER TOOL [JUDGMENT 12] |

COORDINATE SYSTEMS AFTER MOUNTING WORK PIECE

COORDINATE SYSTEM OF PARTS

PARTS IN SIMPLY PARALLEL-TRANSLATED COORDINATE SYSTEMS

Fig. 14

COORDINATE SYSTEM LIST

| | NAME OF COORDINATE SYSTEM | REFERENCE COORDINATE SYSTEM | COORDINATE PARAMETERS | | | | | | | | | | |
|---|---|---|---|---|---|---|---|---|---|---|---|---|---|
| | | | $U_{11}$ | $U_{12}$ | $U_{13}$ | $U_{21}$ | $U_{22}$ | $U_{23}$ | $U_{31}$ | $U_{32}$ | $U_{33}$ | $O_1$ | $O_2$ | $O_3$ |
| 1 | G54 | MCS | 1 | 0 | 0 | 0 | 0 | 1 | 0 | −1 | 0 | 0 | 60 | −80 |
| 2 | G55 | G54 | ⋮ | ⋮ | ⋮ | ⋮ | ⋮ | ⋮ | ⋮ | ⋮ | ⋮ | ⋮ | ⋮ | ⋮ |

GEOMETRIC ELEMENT PARAMETER LIST

| GEOMETRIC ELEMENT LIST | GEOMETRIC ELEMENT NO. | PARAMETERS | | | | | | | | | |
|---|---|---|---|---|---|---|---|---|---|---|---|
| | | 1 | 2 | 3 | 4 | 5 | 6 | 7 | 8 | 9 | 10 |
| 1 CHAMFERED HOLE | 1 | X | Y | Z | I | J | K | D | C | R | |
| 2 STEPPED HOLE | 2 | X | Y | Z | I | J | K | $D_1$ | $D_2$ | R | M |
| 3 STEPPED THREAD HOLE | 3 | X | Y | Z | $I_1$ | $J_1$ | $K_1$ | $D_1$ | $D_2$ | R | M |
| 4 SLOT | 4 | X | Y | Z | I | J | K | D | L | R | $I_2$ |
| 5 CIRCULAR SLOT | 5 | ... | ... | ... | ... | ... | ... | ... | ... | ... | $J_2$ $K_2$ |
| 6 | ... | ... | ... | ... | ... | ... | ... | ... | ... | ... | ... |

X,Y,Z: COORDINATES OF POINT P
I,J,K: SURFACE VECTOR
D: DEPTH
R: RADIUS
M: THREAD SIZE

CHAMFERED HOLE    STEPPED THREAD HOLE    SLOT

Fig. 16

GEOMETRIC ELEMENT LIST

| GEOMETRIC ELEMENT NAMES | GEOMETRIC ELEMENT NO. | COORDINATE SYSTEMS | PARAMETERS | | | | | | | | | |
|---|---|---|---|---|---|---|---|---|---|---|---|---|
| | | | 1 | 2 | 3 | 4 | 5 | 6 | 7 | 8 | 9 | 10 |
| 1 CHAMFERD HOLE | 1 | G54 | | | | | | | | | | |
| 2 STEPPED THREAD HOLE | 2 | G55 | | | | | | | | | | |
| 3 SLOT | 3 | G54 | | | | | | | | | | |
| 4 ... | ... | ... | ... | ... | ... | ... | ... | | | | | |
| 5 ... | ... | ... | ... | ... | ... | ... | ... | | | | | |

CSG PRIMITIVE LIBRARY (Constructive Solid Geometry Primitive)

| | PRIMITIVE NAMES | PRIMITIVE NO. | PARAMETER | | | | | | | | | |
|---|---|---|---|---|---|---|---|---|---|---|---|---|
| | | | 1 | 2 | 3 | 4 | 5 | 6 | 7 | 8 | 9 | 10 |
| 1 | BLOCK | 1 | $X_1$ | $Y_1$ | $Z_1$ | $X_2$ | $Y_2$ | $Z_2$ | $X_3$ | $Y_3$ | $Z_3$ | D |
| 2 | SPLERE | 2 | X | Y | Z | R | | | | | | |
| 3 | CYLINDER | 3 | X | Y | Z | I | J | K | R | D | | |
| 4 | CONE | 4 | X | Y | Z | I | J | K | R | A | | |
| ⋮ | ⋮ | ⋮ | | | | | | | | | | |

X,Y,Z: COORDINATES OF POINT P
I,J,K: SURFACE VECTOR
D: DEPTH
R: RADIUS

CONE

CYLINDER

SPLERE

BLOCK

GEOMETRIC ELEMENT CSG LIBRARY

| GEOMETRIC ELEMENT | | PRIMITIVE | | OPERATOR | PARAMETERS | | | | | | | | | |
|---|---|---|---|---|---|---|---|---|---|---|---|---|---|---|
| NAME | NO. | NAME | NO. | | 1 | 2 | 3 | 4 | 5 | 6 | 7 | 8 | 9 | 10 |
| 1 CHAMFERED HOLE | 1 | CONE | 4 | U | X | Y | Z | I | J | K | R | A | | |
| | 2 | CONE | 4 | U | X | Y | Z | I | J | K | R | A | | |
| | | CYLINDER | 3 | U | X | Y | Z | I | J | K | R | D | | |
| 2 STEPPED HOLE | 2 | CYLINDER | 3 | U | X | Y | Z | I | J | K | R | D | | |
| | | CYLINDER | 3 | U | X | Y | Z | I | J | K | R | D | | |
| | 3 | CONE | 4 | | X | Y | Z | I | J | K | R | A | | |
| 3 STEPPED THREAD HOLE | ... | ... | ... | ... | ... | ... | ... | ... | ... | ... | ... | ... | | |

ELEMENT MEASUREMENT PATH LIBRARY

| GEOMETRIC ELEMENT NAME | GEOMETRIC ELEMENT NO. | MEASUREMENT PATH INITIAL VALUE | MEASUREMENT PATH OPTION |
|---|---|---|---|
| 1 CHAMFERED HOLE | 1 | 1 | 2, 3, 4 |
| 2 STEPPED HOLE | 2 | 1 | 2, 3, 4 |
| 3 STEPPED THREAD HOLE | 3 | 1 | 2, 3, 4 |
| 4 SLOT | 4 | 4 | 5, 6 |
| 5 CIRCULAR SLOT | 5 | 4 | 5, 6 |
| 6 . . . . . | . . . . . | . . . . . | . . . . . |

MEASUREMENT PATH

INTERFERENCE CHECK

INTERFERENCE LIST

|   | GEOMETRIC ELEMENT NAME | GEOMETRIC ELEMENT NO. | GEOMETRIC ELEMENTS IN INTERFERENCE |
|---|---|---|---|
| 1 | CHAMFER HOLD | 1 | |
| 2 | STEPPED THREAD HOLE | 3 | |
| 3 | SLOT | 4 | |
| 4 | . . . . . . . . . | . . . . . . . . . | . . . . . . . . . |
| 5 | . . . . . . . . . | . . . . . . . . . | . . . . . . . . . |

SAFETY ZONE

TOLERANCE TABLE

HOLE TOLERANCE

| HOLE DIAMETER RANGE | TOLERANCE |
|---|---|
| 0 – 10 | 0.1 |
| 10 – 25 | 0.15 |
| 25 – 40 | 0.2 |
| ......... | ......... |
| ......... | ......... |

DIMENSIONAL TOLERANCE

| SIZE RANGE | TOLERANCE |
|---|---|
| 0 – 10 | 0.05 |
| 10 – 25 | 0.08 |
| 25 – 50 | 0.11 |
| ......... | ......... |
| ......... | ......... |

Fig. 25A

| No. | PROGRAM | |
|---|---|---|
| 1 | DMISMN/' EXAMPLE_PROG1' | PROGRAM NAME |
| 2 | FILNAM/' PROG_1' | NAME OF FILE STORING PROGRAM |
| 3 | WKPLAN/XYPLAN | X,Y AXES COINCIDE WITH COORDINATE SYSTEM AXES (IN YZ SURFACE, Y AXIS BECOMES X AXIS) |
| 4 | UNITS/MM, ANGDEC | ENTER UNITS IN MM AND DEGREE |
| 5 | DECL/GLOBAL, REAL, X | |
| 6 | DECL/GLOBAL, REAL, Y | |
| 7 | DECL/GLOBAL, REAL, Z | DECLARE X, Y, AND Z AS REAL NUMBERS |
| 8 | M(ANY_CIRCLE)=MACRO/X1, Y1, Z1, R1, "ANYCR" | DEFINE MACRO PROGRAM |
| 9 | X=ASSIGN/2*R1 | |
| 10 | F(ANYCR)=FEAT/CIRCLE, CART, X1, Y1, Z1,.0, .0,−1.0, X | DEFINE CIRCLE (DEFINITION OF OFFICIAL VALUE) |
| 11 | MEAS/CIRCLE, F(ANYCL), 4 | MAKE CIRCLE BY MEASUREMENT AT 4 POINTS |
| 12 | GOTO/X1, Y1, Z1 | MOVE TO X1, Y1, Z1 |
| 13 | X=ASSIGN/X1+R1−1.0 | |
| 14 | GOTO/X, Y1, Z1 | MOVE CLOSE TO MEASUREMENT POINT |
| 15 | X=ASSIGN/X1+R1 | |
| 16 | PTMEAS/CART, X, Y1, Z1, 1.0, .0, .0 | MEASURE AT TARGET POINT |
| 17 | Y=ASSIGN/Y1+R1−1.0 | |
| 18 | GOTO/X1, Y, Z1 | MOVE CLOSE TO NEXT MEASUREMENT POINT |
| 19 | Y=ASSIGN/Y1+R1 | |
| 20 | PTMEAS/CART, X1, Y, Z1, .0, 1.0, .0 | MEASURE AT TARGET POINT |
| 21 | X=ASSIGN/X1−R1+1.0 | |
| 22 | GOTO/X, Y1, Z1 | |
| 23 | X=ASSIGN/X1−R1 | |
| 24 | PTMEAS/CART, X, Y1, Z1, −1.0, .0, .0 | |
| 25 | Y=ASSIGN/Y1−R1+1.0 | |
| 26 | GOTO/X1, Y, Z1 | |
| 27 | Y=ASSIGN/Y1−R1 | |

Fig. 25B

| No. | PROGRAM | |
|---|---|---|
| 28 | PTMEAS/CART, X1, Y, Z1, .0, −1.0, .0 | |
| 29 | ENDMEAS | FINISH MEASUREMENT AT 4 TARGET POINTS |
| 30 | ENDMACRO | END OF MACRO PROGRAM |
| 31 | SNSET/APPRCH,.125 | DETERMINE HOW CLOSE TO MEASUREMENT POINT THE DEVICE APPROACHES RAPIDLY |
| 32 | SNSET/SEARCH,.125 | DETERMINE HOW FAR FROM MEASUREMENT POINT THE DEVICE MEASURES |
| 33 | SNSET/RETRCT,.125 | DETERMINE HOW FAR THE DEVICE RETRACTS |
| 34 | S(1)=SNSDEF/PROBE, INDEX, POL, 2.0, .0, .0, .0, .0, −1.0, .157 | DEFINE PROBE, ENTER LENGTH FROM PROBE-ATTACHED POSITION TO PROBE. |
| 35 | SNSLCT/S(1) | NOTIFY THE DEVICE OF USAGE OF PROBE 1 |
| 36 | MODE/MAN | SET THE DEVICE TO MANUAL OPERATION, MEASURE PREDETERMINED COORDINATE SYSTEMS (G54, G55), SAVE THE RESULT AS WOKK_CS_1 AND WORK_CS_2. CALIBRATE THE PROBE |
| 37 | T(1)=TOL/DIAM, −.01, .01 | ENTER TOLERANCE UPPER LIMIT AND LOWER LIMIT FOR REFERENCE TO CIRCLE DIAMETER (COMPARISION BETWEEN OFFICIAL VALUE AND MEASURED VALUE) |
| 38 | DISPLAY/PRINT, DMIS, TERM, DMIS, STOR, DMIS | OUTPUT RESULT TO PRINTER, CRT, AND DMIS FORMAT FILE |
| 39 | FILNAM/' PROG1_OUT' | OUTPUT FILE NAME |
| 40 | PRCOMP/ON | CALCULATE RIGHT VALUE BY CORRECTION USING PROBE DIAMETER |
| 41 | FEDRAT/POSVEL, PCENT, .75 | SET MOVEMENT SPEED |
| 42 | FEDRAT/MESVEL, PCENT, .5 | SET MEASUREMENT SPEED |
| 43 | $$ | |
| 44 | RECALL/D(WORK_CS_1) | CALL COORDIANTE SYSTEM 1 |
| 45 | M(ANY_SLOT)=MACRO/X1, Y1, Z1, L, R1, " ANYSLOT_CR1", "ANYSLOT_CR2", & "1P0", "2P0", "3P0", "4P0" | DEFINE MACRO PROGRAM |

Fig. 25C

| No. | PROGRAM | |
|---|---|---|
| 46 | X=ASSIGN/X1+L/2 | |
| 47 | Y=ASSIGN/2*R1 | |
| 48 | F(ANYSLOT_CR1)=FEAT/ DIRCLE, CART, X, Y1, Z1, .0, .0, −1.0, Y | |
| 49 | X=ASSIGN/X1-L/2 | |
| 50 | F(ANYSLOT_CR2)=FEAT/ CIRCLE, CART, X, Y1, Z1, .0, .0, −1.0, Y | DEFINE CIRCLE (DEFINE OFFICIAL VALUE) |
| 51 | MEAS/CIRCLE, F(ANYSLOT_ CR1), 3 | MAKE CIRCLE BY MEASURING 3 POINTS |
| 52 | GOTO/X1, Y1, Z1 | MOVE TO X1, Y1, Z1 |
| 53 | X=ASSIGN/X1+L/2+R1*SIN(5) | |
| 54 | Y=ASSIGN/Y1+R1*COS(5)−0.1 | |
| 55 | GOTO/X, Y, Z1 | MOVE CLOSE TO MEASUREMENT POINT |
| 56 | Y=ASSIGN/X1+R1*COS(5) | |
| 57 | PTMEAS/CART, X, Y1, Z1, SIN(5), COS(5), .0 | MEASURE AT TARGET POINT |
| 58 | X=ASSIGN/X+L/2+R1−0.1 | |
| 59 | GOTO/X, Y1, Z1 | |
| 60 | X=ASSIGN/X+L/2+R1 | |
| 61 | PTMEAS/CART, X, Y1, Z1, 1.0, 0.0, 0. | MEASURE AT TARGET POINT, MOVE CLOSE TO NEXT POINT |
| 62 | X=ASSIGN/X+L/2+R1*SIN(5) | |
| 63 | Y=ASSIGN/X1−R1*COS(5)+0.1 | |
| 64 | GOTO/X, Y, Z1 | |
| 65 | Y=ASSIGN/X1−R1*COS(5) | |
| 66 | PTMEAS/CART, X, Y, Z1, SIN(5), −COS(5), .0 | |
| 67 | ENDMEAS | |

Fig. 25D

| No. | PROGRAM |
|---|---|
| 68 | X=ASSIGN/X1+0.9*L/2 |
| 69 | Y=ASSIGN/Y1+R1-0.1 |
| 70 | GOTO/X, Y, Z1 |
| 71 | Y=ASSIGN/Y1+R1 |
| 72 | F(1P0)=FEAT/POINT, CART, X, Y, Z1, .0, 1.0, .0 |
| 73 | MEAS/POINT, F(1P0), 1 |
| 74 | PTMEAS/CART, X, Y, Z1, .0, 1.0, .0 |
| 75 | ENDMEAS |
| 76 | X=ASSIGN/X1=0.9*L/2 |
| 77 | Y=ASSIGN/Y1-R1+0.1 |
| 78 | GOTO/X, Y, Z1 |
| 79 | Y=ASSIGN/Y1-R1 |
| 80 | F(2P0)=FEAT/POINT, CART, X, Y, Z1, .0, -1.0, .0 |
| 81 | MEAS/POINT, F(2P0), 1 |
| 82 | PTMEAS/CART, X, Y, Z1, .0, -1.0, .0 |
| 83 | ENDMEAS |
| 84 | X=ASSIGN/X1-0.9*L/2 |
| 85 | Y=ASSIGN/Y1-R1+0.1 |
| 86 | GOTO/X, Y, Z1 |
| 87 | Y=ASSIGN/Y1-R1 |
| 88 | F(3P0)=FEAT/POINT,CART, X, Y, Z1, .0, -1.0, .0 |
| 89 | MEAS/POINT, F(3P0), 1 |
| 90 | PTMEAS/CART, X, Y, Z1, .0, -1.0, .0 |
| 91 | ENDMEAS |
| 92 | Y=ASSIGN/Y1+R1-0.1 |
| 93 | GOTO/X, Y, Z1 |
| 94 | Y=ASSIGN/Y1+R1 |

Fig. 25E

| No. | PROGRAM | |
|-----|---------|---|
| 95  | F(4P0)=FEAT/POINT, CART, X, Y, Z1, .0, 1.0 .0 | |
| 96  | MEAS/POINT, F(4P0), 1 | |
| 97  | PTMEAS/CART, X, Y, Z1, .0, 1.0, .0 | |
| 98  | ENDMEAS | |
| 99  | MEAS/CIRCLE F(ANYSLOT_CR2), 3 | MAKE CIRCLE BY MEASUREMENT AT 3 POINTS |
| 100 | GOTO/X1, Y1, Z1 | MOVE TO X1, Y1, Z1 |
| 101 | X=ASSIGN/X1-L/2+R1*SIN(5) | |
| 102 | Y=ASSIGN/Y1+R1*COS(5) −0.1 | |
| 103 | GOTO/X, Y, Z1 | MOVE CLOSE TO MEASUREMENT POINT |
| 104 | Y=ASSIGN/X1+R1*COS(5) | |
| 105 | PTMEAS/CART, X, Y1, Z1, SIN(5), COS(5), .0 | MEASURE AT TARTGET POINT |
| 106 | X=ASSIGN/X-L/2+R1−0.1 | |
| 107 | GOTO/X, Y1, Z1 | |
| 108 | X=ASSIGN/X-L/2+R1 | |
| 109 | PTMEAS/CART, X, Y1, Z1, 1.0, 0.0, .0 | MEASURE AT TARGET POINT, MOVE CLOSE TO NEXT POINT |
| 110 | X=ASSIGN/X-L/2+R1*SIN(5) | |
| 111 | Y=ASSIGN/X1+R1*COS(5)+0.1 | |
| 112 | GOTO/X, Y, Z1 | |
| 113 | Y=ASSIGN/X1−R1*COS(5) | |
| 114 | PTMEAS/CART, X, Y, Z1, SIN(5), −COS(5), .0 | |
| 115 | ENDMEAS | |
| 116 | GOTO/.0, .0, 5.0 | |
| 117 | ENDMACRO | |
| 118 | GOTO/70.0, −50.0, 5.0 | MOVE TO FIRST CIRCLE FOR MEASUREMENT OF 4 CIRCLES |

Fig. 25F

| No. | PROGRAM | |
|-----|---------|---|
| 119 | CALL/M(ANY_CIRCLE), 70.0, -50.0, -12.5, (1CR), 10 | DIFINE FIRST CIRCLE, MEASURE IT, INPUT RESULT TO FA (1CR) |
| 120 | GOTO/70.0, -50.0, 5.0 | MOVE TO FIRST CIRCLE |
| 121 | GOTO/70.0, 50.0, 5.0 | |
| 122 | CALL/M(ANY_CIRCLE), 70.0, 50.0, -12.5, (2CR), 10 | DEFINE SECOND CIRCLE, MEASURE IT, INPUT RESULT TO FA (1CR) |
| 123 | GOTO/70.0, 50.0, 5.0 | |
| 124 | GOTO/-70.0, 50.0, 5.0 | |
| 125 | CALL/M(ANY_CIRCLE), -70.0, 50.0, -12.5, (3CR) | |
| 126 | GOTO/-70.0, 50.0, 5.0 | |
| 127 | GOTO/-70.0, -50.0, 5.0 | |
| 128 | CALL/M(ANY_CIRCLE), -70.0, -50.0, -12.5, (4CR) | |
| 129 | GOTO/-70.0, -50.0, 5.0 | |
| 130 | CALL/M(ANY_SLOT), .0, .0, .0, 60.0, 20.0, "ANYSLOT_CR1", "ANYSLOT_CR2", & "1P0", "2P0", "3P0", "4P0" | MEASURE SLOT |
| 131 | RECALL/D(WORK_CS_2) | CALL PRE-SET COORDINATE SYSTEM 2 FOR MEASUREMENT OF SIDE |
| 132 | GOTO/.0, 40.0, 5.0 | |
| 133 | CALL/M(ANY_CIRCLE), .0, 40.0, -10.0, (51CR) | DEFINE FIRST 2 CIRCLES, MEASURE THEM |
| 134 | GOTO/.0, 40.0, 5.0 | |
| 135 | GOTO/.0, -40.0, 5.0 | |
| 136 | CALL/M(ANY_CIRCLE), .0, -40.0, -10.0, (52CR) | |
| 137 | GOTO/.0, -40.0, 5.0 | |
| 138 | EVAL/FA(1CR), FA(2CR), FA(3CR), FA(4CR), T(1) | COMPARE 4 CIRCLE DIAMETERS MEASURED FIRST |
| 139 | OUTPUT/F(1CR), FA(2CR), F(3CR), F(4CR), T(1) | OUTPUT 4 CIRCLE OFFICIAL VALUES AND TOLERANCE |
| 140 | OUTPUT/FA(1CR), F(2CR), FA(3CR), FA(4CR), TA(1) | OUTPUT MEASURED VALUES OF 4 CIRCLES AND COMPARISION RESULT |
| 141 | ENDFIL | END OF PROGRAM |

FLOW OF MEASUREMENT DATA IN EACH MACHINING

OUT-OF-CONTROL ZONE

GENERATION OF MEASUREMENT PROGRAM IN NC MACHINING AND MACHINING MANAGEMENT BASED ON THE MEASUREMENT PROGRAM

FIELD OF THE INVENTION

The present invention relates to generation of a measurement program used in NC machining and machining management carried out using the measurement program. More specifically, in NC machining carrying out a variety of machining control using numerical control information, the present invention relates to an improved method and device for generating a measurement program from an NC program used in actual machining, and also for machining management based on a measurement result obtained by executing the generated measurement program.

In the present invention, a measurement program as described above is generated at any time regardless of whether or not an NC program is on a run. The measurement program has generality so that it can be used at any time not only for machining which is being carried out but also for machining using another machine tool. When an NC program is modified, the measurement program can also be modified based on the modified program.

BACKGROUND OF THE INVENTION

A numerically controlled machine tool can automatically control an operation of a machine tool by inputting an NC program. Recently, a numerically controlled machine tool has been in wide use in a variety of industrial fields as a computer numerical control machine tool (CNC machine tool) with a combination of techniques such as microprocessor techniques, power electronics techniques, and software techniques.

Usually, individual information such as a tool index command, a main spindle rotation command, a feeding rate command, axis movement/interpolation command, and an auxiliary function command, together with machining history, is incorporated in numerical control information such as an NC program or the like. Numerical control information appropriate for a machine tool to be controlled is thus generated as an NC program.

An NC program generated as described above is used for a variety of machining. However, for high quality machining, measurement necessary for machining is carried out on a final machining product or during each machining process. Based on the measurement result, machining control compensation is carried out at a subsequent machining process on a workpiece to be used next or on the workpiece measured. In conventional and primitive measurement, size of parts is measured partially using a simple measurement instrument such as a micrometer or slide calipers, according to a process inspection table. At a final inspection stage, all important portions of parts are measured. If there is a problem in the measurement result, it is fed back to NC machining. Reflection of the measurement result on the machining control has conventionally been carried out by skilled workers with considerable experience through oral communication or memorandum between operators. No real time and automatic reflection of the measurement result has been possible.

Furthermore, only limited measurement has been possible using a conventional simple inspection process. Therefore, accurate measurement has been dependent on the final inspection, which leads to a delay in realizing the existence of a problem and lower yield by NC machining.

To solve the problems described above, an automatic programming method for measurement has been proposed for reflecting a measurement result on NC machining after sequential automatic measurement using a three dimensional coordinate measurement machine during the NC machining with a measurement program previously generated in each machining process or in a final machining process. According to this conventional technique, regarding measurement itself, it has been possible to perform predetermined measurement quickly and accurately without a skilled operator.

However, the conventional automatic programming is carried out by CAD and CAM, through complex processes using material data, final workpiece form data, tool data, and the like. Therefore, the conventional automatic programming can not be used in all NC machining, and it requires a large-scale machine. Moreover, it is rarely usable except for a case where large number of products are machined using one and the same NC program.

Moreover, a measurement program by the automatic programming is generated based on final product form data, especially on a working, drawing. Therefore, no measurement program optimal for a workpiece form in an operation element, in a machining element or during a machining process in an arbitrary step during an actual execution of the NC program is provided.

The machining element here means a group of operation elements at one machining position of a workpiece. In other words, an operation element means single machining carried out by a tool. For example, it means a single operation such as boring and milling. A machining element means to finish machining through a combination of operation elements on one machining position of a workpiece. For example, in a case of threaded hole drilling, a machining element is defined as a combination of center hole drilling, prepared hole, and tapping. In the present specification, a machining process means a series of all machining operations carried out without a posture change of a workpiece fixed on a machine tool.

In a recent NC machining trend, NC programs to be used are as open and flexible as they can possible be. During actual machining, programs are often modified for the sake of an optimal machining method. Each program is made as a module or having more generality so that unrestricted changes in the program are possible. As a result, a conventional machining program determined rigidly by a working drawing can not adapt with each step in a machining process, actual operation elements or machining elements, and therefore can not be made applicable to a recent state of the art NC machine tool.

Moreover, recent state of the art NC machining carries out CIM (Computer Integrated Manufacturing) using not only a single machine tool but also a combination of other machine tools. In such a case, a conventional, fixed measurement program can neither be applied to other machine tools nor learn in order to be applicable to other machine tools.

The present invention is created taking the conventional problems described above into consideration. The object is to generate a measurement program through analysis of an actual machining program, not based on working drawings. It also aims to provide a new method for machining process control reflecting a measurement result obtained by the measurement program on NC machining.

DISCLOSURE OF THE INVENTION

To achieve the objects described above, the present invention analyzes an NC program, extracts a workpiece form at each step of an actual machining process provided in the NC program as a geometric model, and generates a measurement program based on the geometric model.

When such a measurement program is running, a real time measurement result can be obtained during machining so that the result can immediately be reflected on the subsequent machining process. A modified machining program can thus be used immediately.

Furthermore, according to the present invention, if a machining program is modified, a measurement program is also modified in accordance with the new machining program. It is advantageous that an NC program and a measurement program can always be related to each other and run during actual machining or prior to the subsequent machining step. In NC machining wherein machining control is carried out by an NC program, one aspect of the present invention comprises a workpiece form information extracting unit for extracting information regarding a workpiece form in an arbitrary step of each operation element machining, machining element machining, or machining process machining, through analysis of the NC program, a geometric model generating unit for generating a geometric model of in an arbitrary step based on the workpiece form information, and a measurement program generating unit for generating a measurement program based on the geometric model.

In an NC machining process wherein machining control is carried out by an NC program, another aspect of the present invention comprises a dividing unit for dividing the NC program in each operation element machining or machining element machining by analyzing the NC program, a machining element extracting and coordinate system transforming unit for extracting workpiece form information at each operation element machining or machining element machining divided by the dividing unit, a geometric model generating unit for generating a geometric model in three dimensional coordinate system based on the workpiece form information, a measurement path generating unit for determining a measurement path based on the geometric model, and a measurement program generating unit for generating a measurement program based on the measurement path.

According to still another aspect of the present invention, a machining controller for carrying out the measurement program described in claim 1 further comprises a measurement result analyzing means for using a measurement result as machining control information, the measurement result being obtained by carrying out the measurement program at the end of at least one process among processes defined in the NC program.

In an NC machining wherein machining control is carried out by an NC program, yet another aspect of the present invention comprises the steps of workpiece form information extraction for extracting information regarding a workpiece form in an arbitrary step of each operation element machining, machining element machining, or machining process machining through analysis of the NC program, geometric model generation for generating a geometric model of a workpiece in an arbitrary step based on the workpiece form information, and measurement program generation for generating a measurement program based on the geometric model.

In an NC program wherein machining control is carried out by an NC program, a still further aspect of the present invention comprises the steps of division of the NC program in each operation element machining or machining element machining by analyzing the NC program, machining element extraction and coordinate system transformation for extracting workpiece form information at each operation element machining or machining element machining divided in the above step, geometric model generation for generating a geometric model in a three dimensional coordinate system based on the workpiece form information, measurement path generation for determining a measurement path based on the geometric model, and measurement program generation for generating a measurement program based on the measurement path.

According to a still further aspect of the present invention, a machining control method for carrying out the measurement program described in claim 4 uses a measurement result as machining control information, the measurement result being obtained by carrying out the measurement program at the end of at least one process among processes defined in the NC program.

In the machining control method described in claim 6, the present invention generates a form model in the process based on a measurement result and provides the model as machining control information for a subsequent machining process.

In the method described in either claim 6 or claim 7, the present invention provides tolerance data to the measurement program.

The present invention is also a medium for storing a program which stores the procedures of workpiece form information extraction for extracting information regarding a workpiece form in an arbitrary step of operation element machining, machining element machining, or machining process machining through analysis of the NC program, geometric model generation for generating a geometric model of a workpiece in an arbitrary step based on the workpiece form information, and measurement program generation for generating a measurement program based on the geometric model.

Furthermore, the present invention is also a medium for storing a program to carry out procedures using the measurement result obtained by the measurement program described in claim 4 as a machining control method.

BRIEF DESCRIPTION OF THE DRAWINGS

FIGS. 4A, 4B, and 4C are exemplary lists showing actual machining NC programs used in the embodiments of the present invention.

FIG. 7 shows a list of tools used in the present embodiment.

FIGS. 8A, 8B, 8C, 8D, and 8E show a G code development list derived from the actual machining NC program in the present embodiment.

FIG. 9 is an explanatory diagram showing a program analysis method, tools to be used, and operation elements in machining elements related to the present embodiment.

FIG. 10 shows an explanatory list of operation elements.

FIG. 11 is an explanatory diagram showing an example of a machining pattern definition in the present embodiment.

FIG. 14 shows a coordinate system list.

FIG. 16 shows a geometric element list.

FIGS. 25A, 25B, 25C, 25D, 25E and 25F show an example of a measurement program generated by the present invention.

BEST EMBODIMENT FOR CARRYING OUT THE INVENTION

Hereinafter, a preferred embodiment of the present invention will be explained referring to the accompanying drawings.

Figure 1:
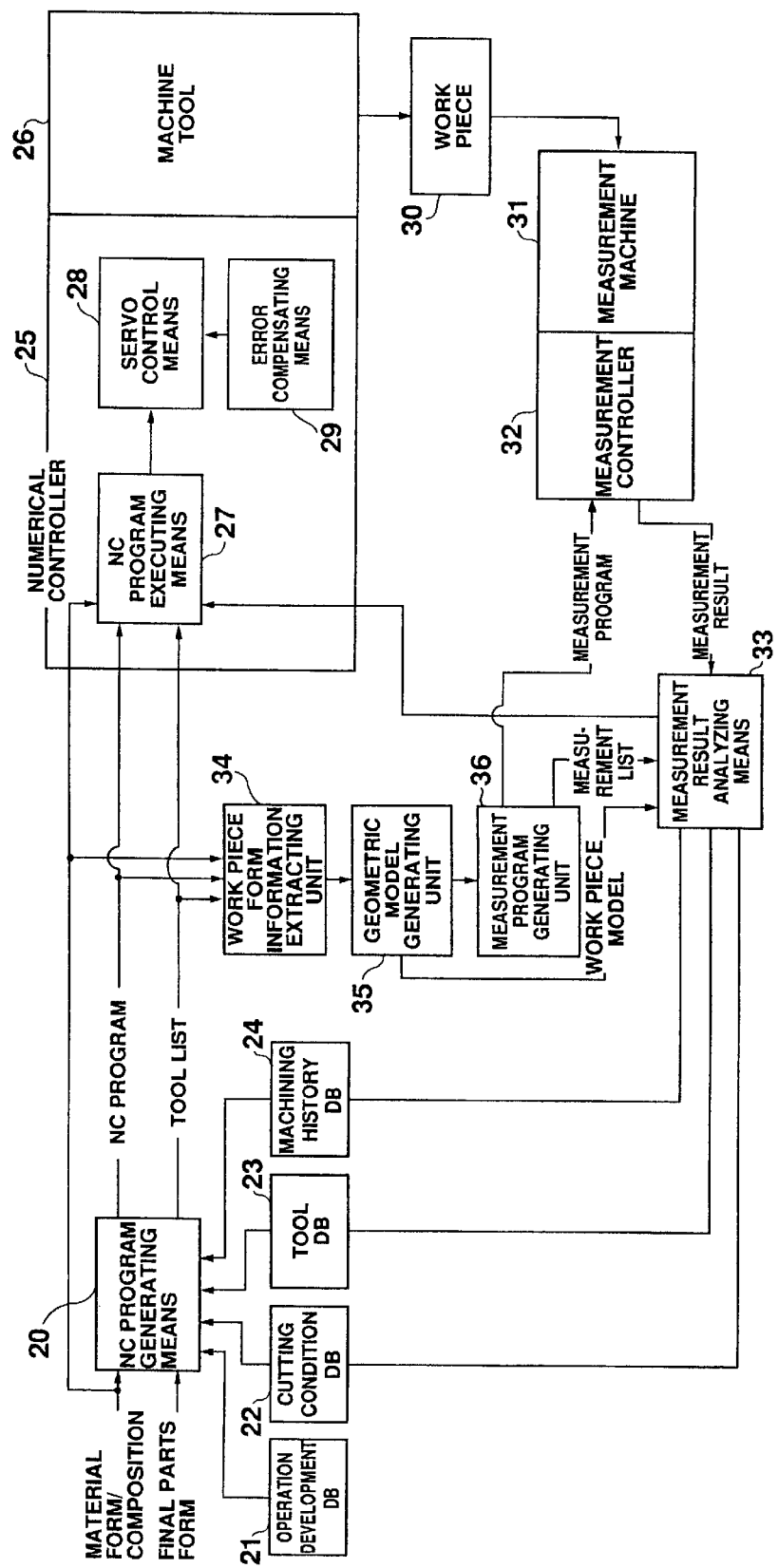
FIG. 1 is a block diagram showing the entire configuration of a numerical control system incorporating measurement program generation and machining control related to the present invention.

FIG. 1 shows an entire configuration of the numerical control machine tool system on which the measurement program generating and process management method related to the present invention is applied.

An NC program is generated in the same manner as a conventional one using material data and final parts form information. In FIG. 1, the material data contain a form of the material and its composition. NC program generating means generates an NC program using the input material data and the final parts form, as well as know-how data stored in the past and provided by a variety of data bases. In the present embodiment, the data bases comprise an operation development data base 21, a cutting condition data base 22, a tool data base 23, and a machining history data base 24. The NC program generating means are provided by these data bases reference data for NC program generation such as past on-site know-how, on-site specification, conditions necessary for actual machining, and specific conditions for a machine tool to be used.

The NC program generated as described above and a tool list are sent to a numerical controller 25 whereby necessary dry run, test cut, or simulation are carried out. After the NC program modification and editing (not shown in FIG. 1), an actual machining NC program to be finally used on site is completed in the numerical controller 25.

The numerical controller 25 comprises NC program executing means 27, servo control means 28, and error compensating means 29, all of which are for driving a machine tool 26. The NC program, the tool list, and the material data are input to the NC program executing means 27. The NC program executing means 27 performs interpolation processing based on an appropriate feeding run decided by the input data with reference to a later-described measurement result. The NC program executing means supply a servo control signal to the servo control means 28. The NC program executing means can perform feeding control of the machine tool 26 in accordance with the NC program by an output driving signal supplied from the servo control means 28. The error compensating means 29 is set for compensating an error of workpiece size and position caused by a thermal expansion of the machine tool 26 or the like. The error compensating means can compensate the error caused by the thermal expansion of the machine tool or the like using an output from a measurement device set on the machine tool 26.

As described above, according to the NC program, the machine tool 26 performs a desired operation element machining, machining element machining, and machining process machining on a workpiece 30 placed on a table, and finishes machining on the workpiece 30 in a first posture.

After finishing the machining process machining on the workpiece 30 in the first posture, a measurement machine 31 measures a coordinate system of the workpiece 30 based on a measurement program in a measurement controller 32. The measurement result is fed back through measurement result analyzing means 33 to the NC program executing means in the numerical controller 25 for the use in the subsequent process. If necessary, the measurement result is also provided to each data base 21, 22, 23, and 24. As described above, according to the embodiment shown in FIG. 1, desired numerical control machining can be carried out on the workpiece 30 based on the NC program generated. After machining process machining has been carried out on the workpiece 30 in the first posture, the posture of the workpiece 30 is changed to a second posture, and machining based on the NC program is carried out on the workpiece in the second posture.

What is characteristic about the present invention is that the measurement program provided to the measurement controller 32 is generated using an actual machining NC program supplied to the numerical controller 25. Therefore, a workpiece form information extracting unit 34, a geometric model generating unit 35, and a measurement program generating unit 36 are provided for this purpose.

The workpiece form information extracting unit 34 is supplied with the tool list, and the actual machining NC program output from the NC program generating means 20. Based on these input data, workpiece form information is extracted for an arbitrary step of each operation element machining, machining element machining, and machining process machining through analysis of the NC program. The extracted workpiece form information is converted by the geometric model generating unit 35 into a three dimensional geometric element or a geometric model in the arbitrary step. For the geometric element or the geometric model, the measurement program generating unit 36 can generate an optimal measurement program by selecting a measurement path from predetermined measurement paths. As is obvious from FIG. 1, the measurement program generated as described above is provided to the measurement controller 32 while the geometric model generated by the geometric model generating unit 35 is supplied to the measurement result analyzing means 33. The measurement list generated by the measurement program generating unit 36 is also provided to the measurement result analyzing means 33. In the present invention, not only the machining list and the NC program described above but also the material data and the final parts form may be provided to the workpiece form information extracting unit 34. In this case, it enables determination of a more secure and simpler movement path of a measuring probe or the like.

Therefore, according to the present invention, a measurement program is always related to an actual machining NC program. It makes it possible to obtain an optimal measurement program in response to an NC program to be used in actual machining. A measurement result obtained by using such a measurement program is always provided to the numerical controller 25, which enables machining control in response to the measurement result.

Figure 2:
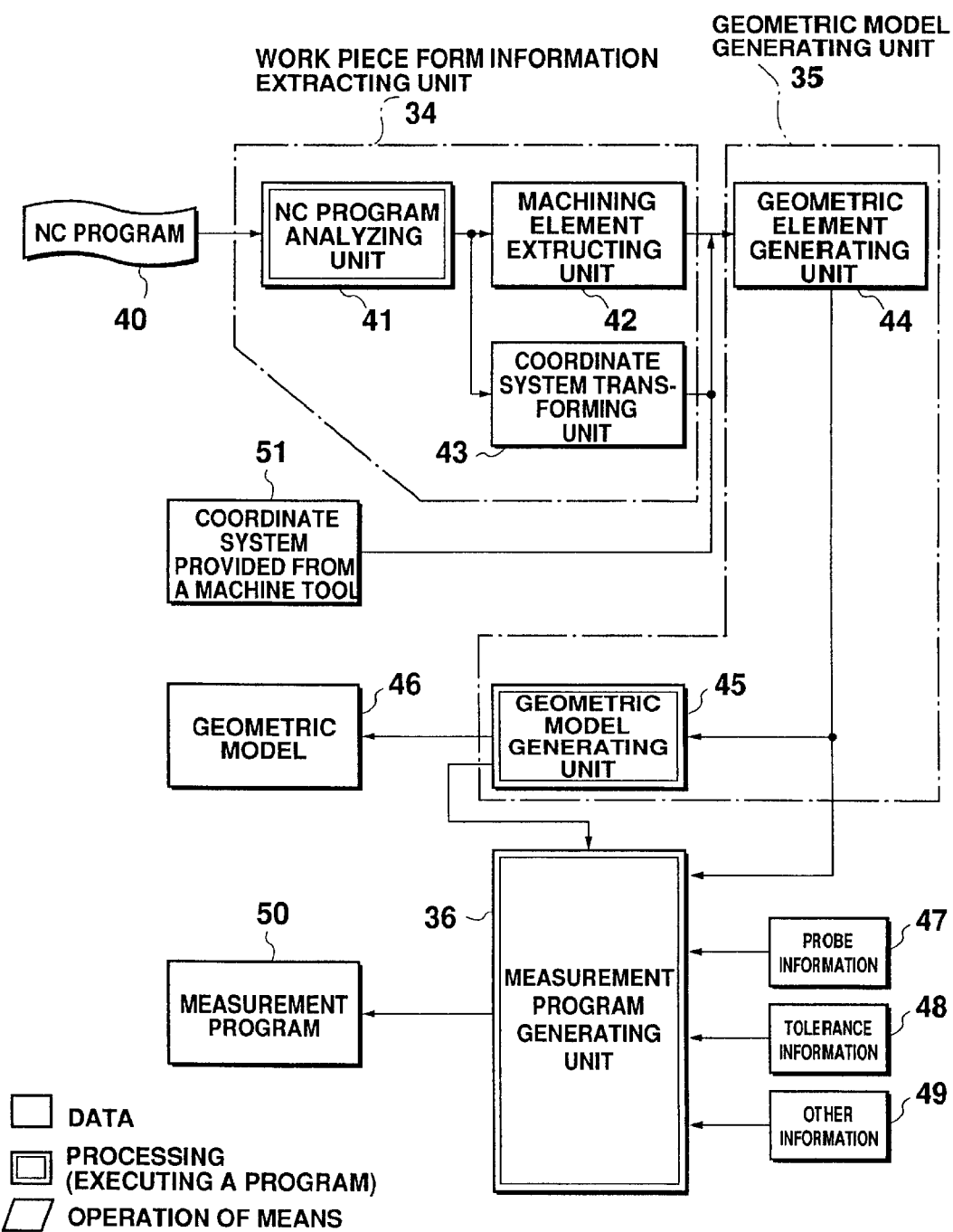
FIG. 2 is a block diagram showing a measurement program generating device related to the present invention.

FIG. 2 shows a detailed configuration regarding the measurement program generating unit of the numerical control machine tool system (shown in FIG. 1). In the present embodiment, measurement is carried out by defining a machining element on which NC machining is being carried out as one measurement unit. A measurement timing is defined as the time when an machining element is obtained after a series of machining steps on an operation element is finished. It is of course possible to carry out measurement at the time of machining process completion when a plurality of machining elements have been machined. In an actual measurement program, measurement timing is either completion of machining elements or completion of a machining process.

In FIG. 2, an NC program 40 is provided to an NC program analyzing unit 41 in the workpiece form information extracting unit 34. The NC program analyzing unit 41 first divides the NC program into portions classified by operation elements using the NC program 40 and tool data which have been separately provided. The NC program analyzing unit 41 provides the operation element information to a machining element extracting unit 42. In the machining element extracting unit 42, machining elements which are used in the NC program are extracted and output in combination with operation elements. The NC program analyzing unit 41 also provides coordinate data used in the NC program to a coordinate system transforming unit 43 whereby the coordinate system generated for NC machining is transformed into a three dimensional coordinate system for measurement. The thus extracted machining element list or transformed coordinate system list are provided to a geometric element generating unit 44 in the geometric model generating unit 35 whereby the machining element specified by the NC program is transformed and output as a geometric element in an ordinary three dimensional coordinate system. In the present embodiment, the geometric element is further composed into a geometric model by a geometric model generation processing unit 45. The composed model is provided to the measurement program generating unit 36. In the present invention, transformation into a geometric model is of course not necessarily needed, and the geometric element list output from the geometric element generating unit 44 can also be provided directly to the measurement program generating unit 36. Furthermore, the geometric model 46 generated by the geometric model generation processing unit 45 is supplied to the measurement result analyzing means 33 as shown by FIG. 1.

The measurement program generating unit 36 is provided with the geometric model or the geometric element list in addition to probe information 47 from the measurement machine 31, tolerance information 48, and other necessary information 49. Based on the input information, a measurement program 50 is generated and the measurement program is provided to the measurement controller 32 shown in FIG. 1.

FIG. 2 explains outline procedures for generating the measurement program 50 out of the NC program 40. In the following description, details of the procedures will be explained.

Extraction of Operation Elements and Machining Elements

A detail of the NC program analyzing unit 41 for extracting the operation elements will first be explained referring to FIGS. 3 to 11.

Figure 3:
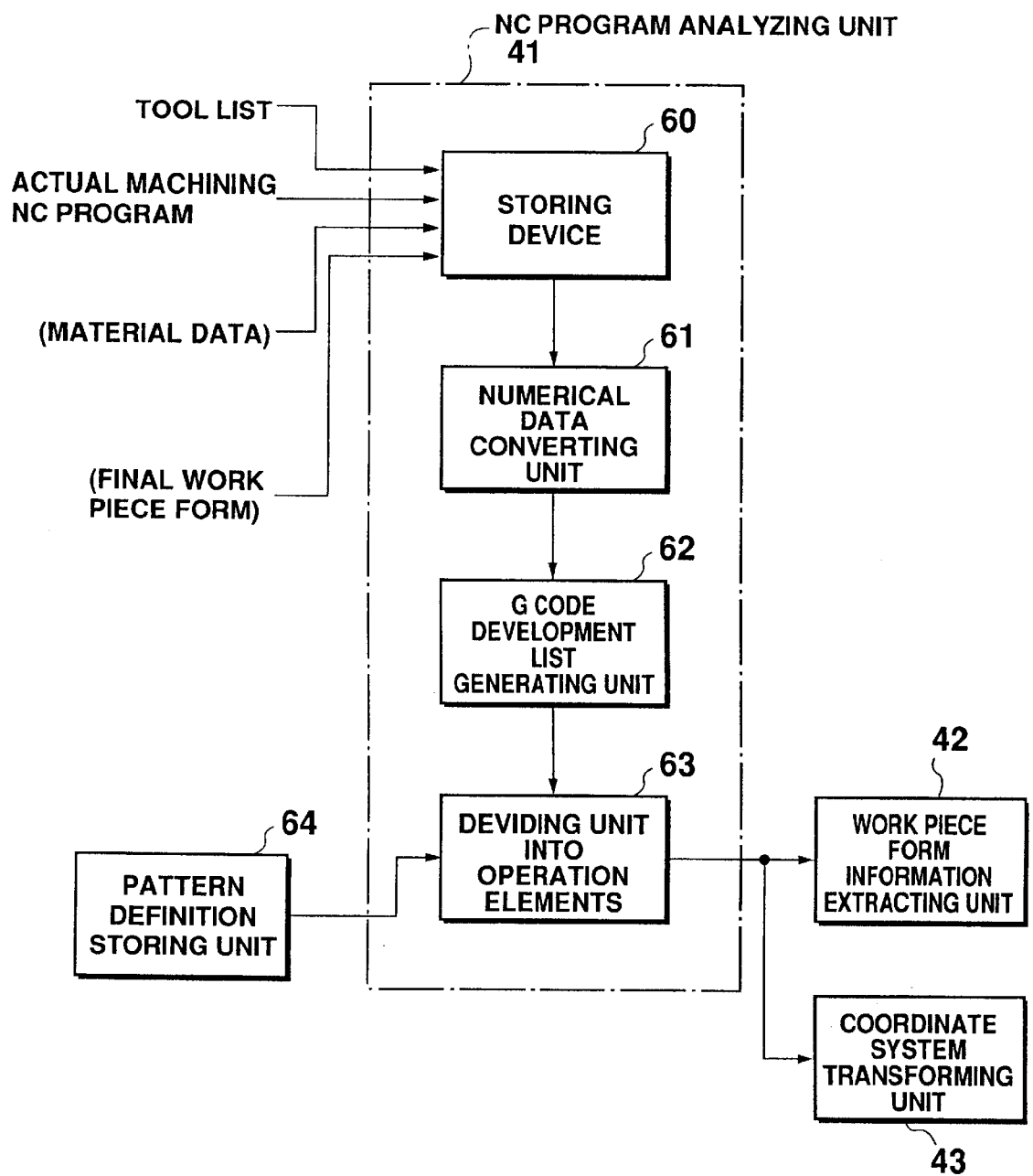
FIG. 3 is a block diagram showing a workpiece form information extracting unit related to the present invention in the system shown in FIG. 2.

FIG. 3 shows a detail of the NC program analyzing unit 41 related to the present invention in the workpiece form information extracting unit 34 (FIG. 2). The NC program analyzing unit 41 is supplied with an actual machining NC program, and a tool list as described above. If necessary, material data and final workpiece form are also provided.

In the NC program analyzing unit 41, the input data are stored in a storing device 60. The actual NC program is analyzed block by block, and data are converted by a numerical data converting unit 61. The data are entered as a G code development list by the G code development list generating unit 62. At this time, a plurality of operations are included in one block such as the case for a macro program or sub-programs, they are developed into basic commands according to an RS-274-D format and then entered in the G code development list. The development into G code is not necessarily needed by the present invention. However, they are developed into G code which is easy to interpret, in order to process the actual machining NC program by a computer.

In the program analyzing unit 41, the entire actual machining program is divided by a dividing unit 63 into operation elements referring to the G code development list.

Division by the dividing unit 63 of the NC program into operation element machining is preferably carried out focusing on a sequence number (N number), tool index (T code), tool exchange (M6), and optional stop (M01). On an actual operation, the program division into operation element machining can be performed by firstly paying attention to a tool exchange. During the time between tool exchanges, a one tool is used, which is utilized as an operation element span. However, it is preferable to perform secure division into operation element machining by reading a path pattern of a tool as well as the tool exchange, since a plurality of operation element machining steps can be carried out using one and the same tool, such as the case where drilling of a plurality of prepared hole is carried out using one drill.

FIG. 4A through 4C show an example of an actual machining NC program used in the present embodiment on which a program number 00001 is attached.

Figure 5:
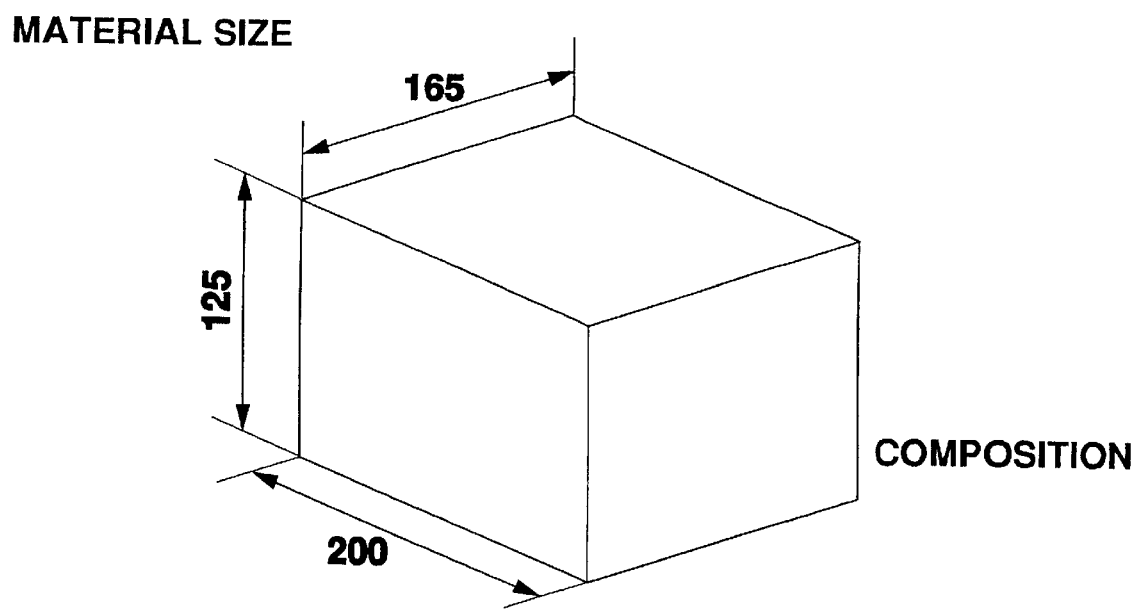
FIG. 5 shows an exemplary material form used in the embodiment of the present invention.
Figure 6:
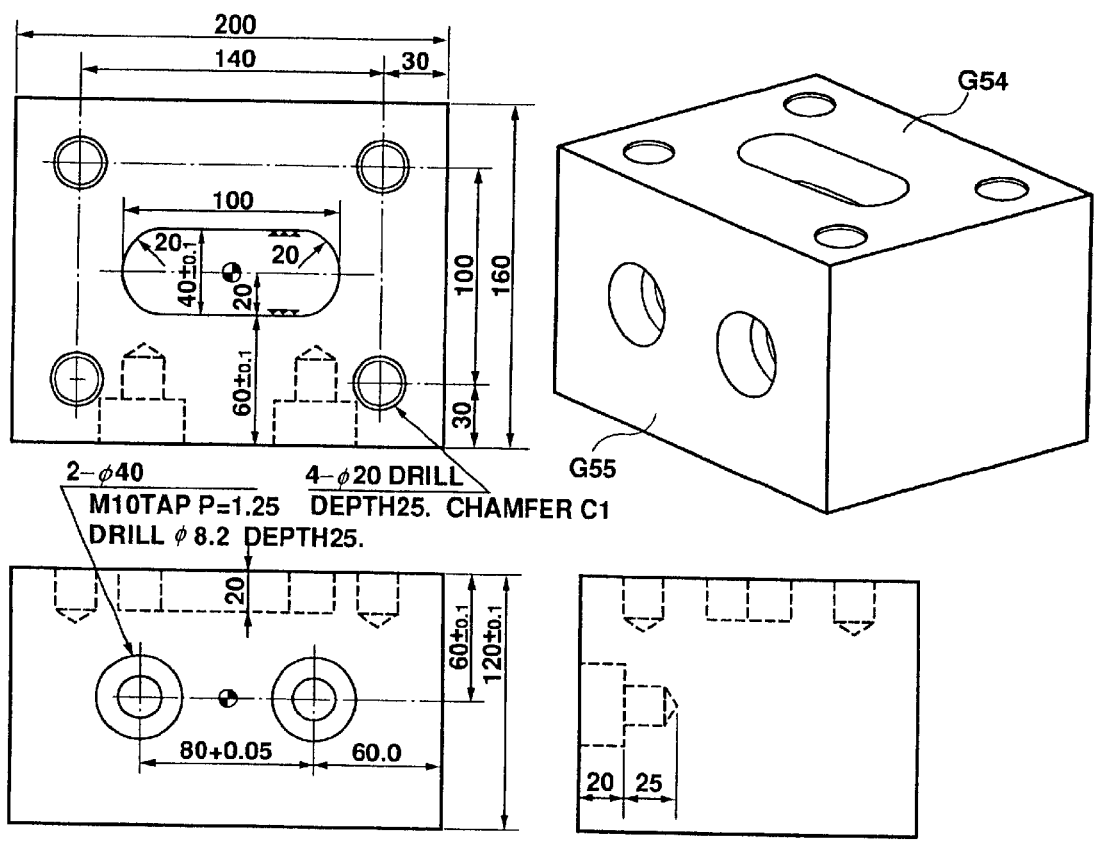
FIG. 6 shows a final workpiece form used in the present embodiment.

FIG. 5 shows a material form to be machined by the actual machining NC program, while FIG. 6 shows the form of a final workpiece to be produced from the material shown in FIG. 5 by the actual machining NC program. These material data (including composition of the material) and the final workpiece form are provided to the NC program analyzing unit 41 as described above. As is obvious from FIG. 6, in this machining, upper surface milling, side milling, machining of two tapped holes in the front, drilling of four chamfering tooled hole on the upper surface, and a slot machining need to be carried out.

For such machining, the NC program generating unit 20 determines machining procedures, develops the procedure into operation elements, decides a tool to be used in each operation element, and determines a cutting condition for each tool.

FIG. 7 shows a tool list to be used in the program 00001. Each tool number is shown in the form of a T code, and data about each tool are listed as shown by FIG. 7. The tool list is provided to the NC program analyzing unit 41.

In the program analyzing unit 41, the actual machining NC program is stored in the storing device 60, and converted into G code development list which is easier for a computer to analyze by the G code development list generating unit 62 via the numerical data converting unit 61. In FIGS. 8A through 8E, a list of the actual machining NC program 00001 developed into G codes is shown. The actual machining NC program and the G code list are linked by line numbers, and their contents are essentially the same.

The actual machining NC program in the present embodiment is partitioned into 9 sequences with sequence numbers 1 to 9 being attached thereto. These 9 sequences are classified as operations using different tools. In the present embodiment, even when one and the same tool is used, if different positions of a material are machined using the tool, it is recognized as different operation elements. In this case, the program is divided into operation elements based on the machining path of the tool, as described above. However, to simplify explanation, a machining condition extraction example is shown for each operation element machining in each of the 9 sequences.

Analysis of Operation Elements in N1

T1 is selected in line 4, and M6 (tool exchange) is performed in line 5. Therefore, it is understood that until line 7 where the following M6 (tool exchange) is commanded, tool T1 is used for machining. In the present embodiment, a group of such lines in the program is expressed as sequence N1. However, it is obvious that in the actual machining NC program, this kind of sequence number is meaningless for tools.

It is understood from T code 1 in the tool list shown in FIG. 7 that the tool T1 is a 100 mm diameter face milling cutter. Line 7 specifies a work coordinate system G54. In the present embodiment, the coordinate system G54 shows the upper surface of the final workpiece form shown in FIG. 6. The above procedure is defined as machining in a first process.

In line 10, the workpiece is sent for cutting feed for the fist time, and the surface to be cut is Z=0.1 (line 9). The point where the face milling cutter should descend has the X, Y coordinate values (160, 50) specified by line 7. Lines from 10 to 13 show that a moving axis of the tool alternately moves such as X, Y, X, Y, while the Z coordinate value stays the same. By comparing such a tool path pattern with definition data stored in a pattern definition storing unit 64, this operation element can be judged as machining on a surface. In FIG. 9, a pattern definition example of an operation element, a tool to be used, and a program analyzing method, all of which are for the machining element, is shown. Using such a pattern definition, recognition of operation element machining is performed.

In FIG. 10, an example of an operation element list is shown. In the present embodiment, such operation elements are provided to the machining element extracting unit 42 and the coordinate system transforming unit 43.

The operation elements shown in FIG. 10 are of course an example, and definition of not only comparatively large operation elements as shown here but also operation elements divided into much smaller elements is preferable in the present invention. Levels of operation element definition can be set arbitrarily in response to precision of a machine tool, or resolution of the entire machining system.

Further analysis of the program for the sequence N1 leads to the fact that lines 10, 11, and 12 show the same path as in lines 15, 16, and 17 except for the Z coordinate values. Therefore, it is understood that lines 15, 16, and 17 show finishing, since there is no operation element in which the same tool is used thereafter.

The lines 19 through 30 are judged to show a second machining process, since they use a work coordinate system G55 which is the coordinate system for machining on the front of the final workpiece form in the present embodiment shown in FIG. 6. Lines 22, 23, and 24 show the same path as in lines 27, 28, and 29 except for the Z coordinate values, and the Z coordinate value difference is 0.1. Therefore, the lines 22, 23, and 24 are judged to show rough cutting, while the lines 27, 28, and 29 are judged to show finishing. Moreover, since the cut area covers the whole of the workpiece, it is judged to be a surface machining element.

Hereinafter, analysis for operation elements in the sequences N2 to N9 will be briefly explained.

Analysis of Operation Elements in N2

In line 31, a main tool is changed to T2, and the procedure moves to operation elements in N2. From the tool list in FIG. 7, T2 is recognized to be a center drill with a 3 mm diameter. As a result, the operation element in N2 is judged to be drilling, and the following 5 operation elements in a first machining process and 2 operation elements in a second machining process are extracted.

The First Machining Process (G54)
position 1 (70.000, 50.000), position 2 (−70.000, 50.000), position 3 (−70.000, 50.000), position 4 (70.000, −50.000), position 5 (30.000, 0.000)
The Second Machining Process (G55)
position 1 (40.000, 0.000), position 2 (−40.000, 0.000)
Analysis of Operation Elements in N3

In line 47, a main tool is changed to T3, and the procedure moves to operation elements in N3. From the tool list in FIG. 7, T3 is recognized to be a drill with a 20 mm diameter. As a result, the operation element in N3 is judged to be drilling, and the following 5 operation elements are extracted.

A First Machining Process (G54)
position 1 (70.000, 50.000), position 2 (−70.000, 50.000), position 3 (−70.000, 50.000), position 4 (70.000, −50.000).
Analysis of Operation Elements in N4

In line 57, a main tool is changed to T4 which is a drill with a 30 mm diameter. As a result, the operation element in N4 is judged to be drilling, and the following 4 operation elements are extracted.

A First Machining Process (G54)
position 1 (30.000, 0.000, −19.9)
position 2 (−70.000, 50.000), position 3 (−70.000, −50.000)
position 4 (70.000, −50.000)
Analysis of Operation Elements in N5

In line 68, a main tool is changed to T5 which is an end mill with a 25 mm diameter.

End mills and face milling cutters usually have a variety of machining patterns they can handle. Therefore, it is not easy to judge what operation elements are extracted simply from the tool to be used. However, in the present embodiment, this judgment is carried out by comparing a tool machining path to machining pattern definitions by the dividing unit 63 and the machining element extracting unit 42. Some examples have already been shown herein for the cases of a face milling cutter and drills. Moreover, FIG. 11 shows an example of correlation between these machining pattern definitions and machining elements.

Now, turn back to operation elements in sequence N5. Lines 71 through 74 show that a tool descends to a surface to be machined (z–19.9) at position 3 (30.0, 0) in machining process 1 (G54). Lines 75 through 81 show a movement on one surface. It is judged that this movement has a closed path, since the position in line 75 (–50.0, 0) are the same as the position in line 80 (–50.0, 0). Moreover, lines 5 through 80 show the inside of the path, since a leftward compensation of G41 is specified in line 75. The path in G41 shifted inside by the radius of the tool from the path described above is set, from which the path further shifted by the radius of the tool is found. In this case, the path has been erased. From these tool paths, no residual stock removal remains inside when the tool moves as lines 75 through 80 indicate. Therefore, it is judged to be a pocket machining element. This is a pattern where an end mill is used in the machining element pocket as shown by machining pattern definition in FIG. 11. As described above, program analysis can be carried out with certainty on a complex program such as above, using the pattern definition in FIG. 11.

The movement of the tool in line 75 is judged to be an approach to the workpiece, while the movement in line 81 is judged to be a recession from the workpiece. The amount of the approach and the recession are stored in a pattern list of pocket machining elements shown in FIG. 12.

Line 82 shows upward movement from the work surface, and line 83 shows positioning to position (40, 0) in a second machining process (G55). Lines 86 through 88 show movement on one surface. Line 87 shows a movement along a circular path. Line 86 shows a leftward compensation of G41 for the circular path, as described above, and it is judged to show the inside of the path. The path in G41 shifted by the radius of the tool from the circular path described above is found, from which the path further shifted by the radius of the tool is then found. However, the path has been erased as shown by judgment 1. Therefore, it is judged that no residual stock removal remains inside and it is judged to be a pocket machining element. However, it is finally judged to be a drilling element, since the workpiece has been machined at the center position of the pocket machining element in sequences N2 and N4 and the form of the pocket is a circle. As described above, recognition of operation elements can be carried out by using the machining pattern definitions for sequence N5.

Analysis of Operation Elements in N6

Line 97 shows that a main tool is changed to T6 which is a 25 mm diameter end mill.

Movement by lines 105 through 108 is carried out on one surface, and the position in lines 105 and 108 are the same. Therefore, the movement is judged to have a closed path. This path and tools are compared by judgment 1. As a result, if there is no residual stock removal inside, it is judged to be a pocket machining element. The path thereof is the same as the path in sequence N5. Therefore, it is judged to be finishing, while the machining of operation element 1 in sequence N5 is judged to be rough cutting. It is also judged that points in lines 105 through 108 show a final form.

Analysis of Operation Elements in N7

Line 111 shows that the main tool is changed to T7 which is an 8.2 mm diameter drill. Therefore, sequence N7 is judged to be a drilling element, and the following operation elements are extracted.

A First Machining Process (G55)
position 1 (40.000, 0.000)
position 2 (–40.000, 0.000)

Analysis of Operation Elements in N8

Line 119 shows that the main tool is changed to T8 which is a 25 mm diameter chamfering tool. The chamfering tool is fixed by a fixed drilling cycle in G81 while z coordinate value rises as shown by lines 124 through 128. Therefore, the operation element in N8 is judged to be a drilling element.

A First Machining Process (G54)
position 1 (70.000, 50.000)
position 2 (–70.000, 50.000)
position 3 (–70.000, –50.000)
position 4 (70.000, –50.000)
A Second Machining Process (G55)
position 1 (40.000, 0.000)
position 2 (–40.000, 0.000)

Analysis of Operation Elements in N9

Line 134 shows that the main tool is changed to T9 which is an M10 tap. Therefore, the operation element in sequence 7 is judged to be a hole drilling element.

A First Machining Process (G55)
position 1 (40.000, 0.000)
position 2 (–40.000, 0.000)

As described above, the actual machining program is sequentially analyzed, divided into operation elements, and operation-element extracted.

As described above, the NC program is divided into operation elements. Regarding some operation elements, an analysis result of the actual machining NC program shown in FIGS. 4A through 4C is briefly summarized herein. A slot on G54 surface in FIG. 6 has a surface on Z=0 prior to sequence N1. This surface is cut twice on Z=0.5 and Z=0. Since it is deeper on Z=0, this surface is extracted as the operation element. In the middle of sequence N2, a center hole is drilled on the surface at X=30 and Y=0. Therefore, it is understood that a center drilling element is generated herein.

The operation element on the above surface is also applicable to the following operation element in the same manner.

In the former half of sequence N4, it is understood that a prepared hole is drilled in the center operation element generated above and a hole operation element is being generated therein.

In the former half of the sequence N5, a slot is machined and it is understood that slot operation element has been finished.

Moreover, in sequence N6, a slot machining for finishing is carried out, and it is understood that a slot operation element has been generated.

As described above, in the NC program analyzing unit 41, the NC program 40 can be analyzed by dividing it into operation elements.

The operation elements divided and analyzed as described above are converted into a machining element list by the machining element extracting unit 42. Actually, it is preferable to perform measurement during NC machining based on machining elements, not on operation elements. This is because machining to create one form at a position on a materiel is finished by completion of a machining element.

Based on the plurality of operation elements described above, operation is focused on a machining element by being classified according to a position to be machined at and a kind of a tool. Relationships between operation elements can be understood from the order of machining in the program. If a center operation element and a hole operation element are taken as an example among the plurality of operation elements, it is understood from their positions to be machined at that no center operation element needs to be considered for the operation element and only the hole operation element is extracted. Likewise, it is understood for a plurality of slot operation elements that only a final slot operation is extracted as the machining element if the slot operations are carried out at one position.

As described above, a machining element list necessary for measurement is extracted by the machining element extracting unit 42 and provided to the geometric model generating unit 35.

Coordinate Transformation

Figure 12A:
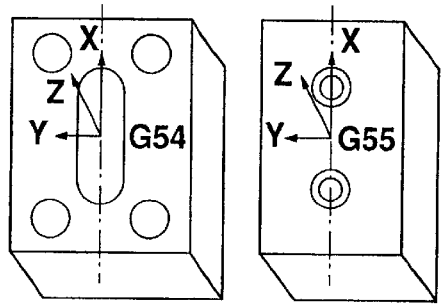
FIG. 12A is an explanatory view showing a relationship between two coordinate systems after a workpiece is mounted on a machine tool.
Figure 12B:
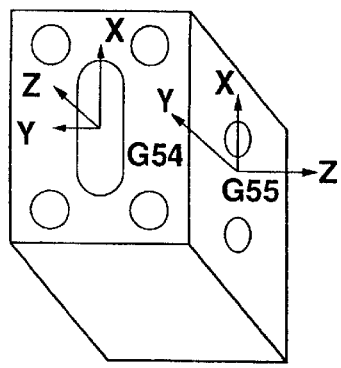
FIG. 12B is an explanatory view of a coordinate system in FIG. 12A related to actual workpiece form.

Even when the machining element list is obtained as described above, it can not be used for a measurement program as it is. In other words, in an NC program, the machining coordinate system is related to the posture of a workpiece fixed on a pallet. For example, the workpiece form shown in FIG. 6 is actually shown as in FIG. 12A if it is on the pallet of a machine tool. Moreover,machining on its upper surface is shown by the coordinate system G54, while machining on its front surface is shown by the coordinate system G55. In the machining program, machining in G54 and G55 is carried out by changing the posture of either the workpiece on the pallet or the tool reference surface. As a result, the surface which the coordinate system of the machining program is dealing with is different from the coordinate system surface of the actual workpiece form shown in FIG. 12B. In machining by the NC program of the present embodiment, the upper and front surfaces of the form shown in FIG. 6 are on the same pallet and machined in the same machining process. However, this is for the sake of machining convenience, and it is different from the relationship between geometric positions of the upper and front surfaces of the actual form shown in FIG. 12B. As shown by FIG. 12A, in the machining program, the coordinate values of the upper surface are based on the coordinate system G54, while the coordinate values of the front surface is based on the coordinate system G55. In other words, the coordinate system G55 is created by simple parallel translation of the coordinate system G54 in XYZ directions. However, the coordinate system G54 of the actual workpiece form is created by parallel translation in XYZ directions plus rotation of G54, as shown by FIG. 12B. Matrix expression of this transformation is described as follows:

$$\begin{vmatrix} X_{55} \\ Y_{55} \\ Z_{55} \\ 1 \end{vmatrix} = \begin{vmatrix} 1 & 0 & 0 & 500 \\ 0 & 1 & 0 & -50 \\ 0 & 0 & 1 & 0 \\ 0 & 0 & 0 & 1 \end{vmatrix} \begin{vmatrix} X_{54} \\ Y_{54} \\ Z_{54} \\ 1 \end{vmatrix} \quad \text{On the workpiece form}$$

$$\begin{vmatrix} X_{55} \\ Y_{55} \\ Z_{55} \\ 1 \end{vmatrix} = \begin{vmatrix} 1 & 0 & 0 & 0 \\ 0 & 1 & 0 & 60 \\ 0 & -1 & 1 & -80 \\ 0 & 0 & 0 & 1 \end{vmatrix} \begin{vmatrix} X_{54} \\ Y_{54} \\ Z_{54} \\ 1 \end{vmatrix} \quad \text{On the actual parts}$$

(Rotation / Parallel translation) Equation 1

Therefore, in the coordinate system transforming unit 43, coordinate system transformation between the NC program coordinate system and the actual form coordinate system is carried out as shown by the above coordinate system transformation, and the transformed coordinate system is provided to the geometric element generating unit 44 of the geometric model generating unit 35.

In FIG. 2, coordinate system 51 of the machine tool is input to the coordinate system transforming unit 43. It is effective when a position of a workpiece on a pallet becomes arbitrary upon a change of machining processes, which happens occasionally depending on the machining program in use. In such a case, the coordinate system of the machine tool is input and coordinate system transformation in response to workpiece form can be carried out effectively.

Figure 13:
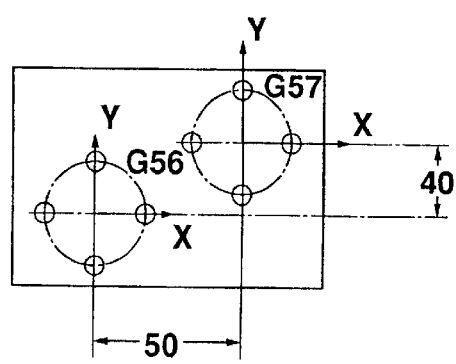
FIG. 13 is an explanatory view showing a relationship between other two coordinate systems on the machine tool.

For example, in a case where coordinate systems G56 and G57 on a single workpiece are set as shown by FIG. 13, which is different from the workpiece form in FIG. 6, the two coordinate systems are created by simple parallel translation of each other. Therefore, by calculating relative positions of the two, transformation of the coordinate systems is carried out easily, as the following preferable coordinate system transformation equation shows.

$$\begin{vmatrix} X_{56} \\ Y_{56} \\ Z_{56} \\ 1 \end{vmatrix} = \begin{vmatrix} 1 & 0 & 0 & 50 \\ 0 & 1 & 0 & 40 \\ 0 & 0 & 1 & 0 \\ 0 & 0 & 0 & 1 \end{vmatrix} \begin{vmatrix} X_{57} \\ Y_{57} \\ Z_{57} \\ 1 \end{vmatrix} \quad \text{Equation 2}$$

Measurement during machining is usually carried out at the end of a machining process. In some cases, a workpiece is moved from a machine tool to a measurement machine. In such cases, the workpiece can be fixed on a table of the measurement machine in any direction. Therefore, the measurement device does not know how a reference coordinate system among any one of the coordinate systems G54 and G55 shown in FIG. 12A, for example G54, is placed. Therefore, the measurement device measures geometric elements necessary for obtaining G54 which is the reference coordinate system, using a program to generate a conventional measurement program. In this manner, the measurement device knows the position of the coordinate system G54, and stores a relationship between the coordinate system of its own (machine coordinate system) and the coordinate system G54. As a result, a probe can move based on the coordinate system G54, since the coordinate values of parts form size is based on the coordinate system G54. The measurement machine can thus provide such data to a measurement program during actual measurement operation. The coordinate system transformation equation used in such a measurement device is shown below:

$$\begin{vmatrix} X_{54} \\ Y_{54} \\ Z_{54} \\ 1 \end{vmatrix} = \begin{vmatrix} U_{11} & U_{12} & U_{13} & O_1 \\ U_{21} & U_{22} & U_{23} & O_2 \\ U_{31} & U_{32} & U_{33} & O_3 \\ 0 & 0 & 0 & 1 \end{vmatrix} \begin{vmatrix} X_{57} \\ Y_{57} \\ Z_{57} \\ 1 \end{vmatrix}$$

G54     WORK CS 1     Machine Coordinate System     Equation 3

Once a reference coordinate system, for example G54, is known, the coordinate system G55 can easily be found by the reference coordinate system G54. FIG. 14 shows a relationship between the coordinate systems. The coordinate system G55 stores the relative position of the reference coordinate system G54 as parameters. The reference coordinate system G54 may also be found by inputting into Equation 3 the parameters previously found through Equation 3 which show a calculation between the coordinate system G54 and the machine coordinate system when fixed on the measurement machine.

In actual measurement, the measurement device of course places parts at a fixed position using a fixture, measures the reference coordinate system G54 once, and then stores G54. Individual measurement of G54 in each form is omitted.

Generation of Geometric Model or Geometric Element List

As described above, the machining element list and the coordinate system transformation data are provided to the geometric element generating unit 44, and a geometric element list is generated based on the input information.

Figure 15:
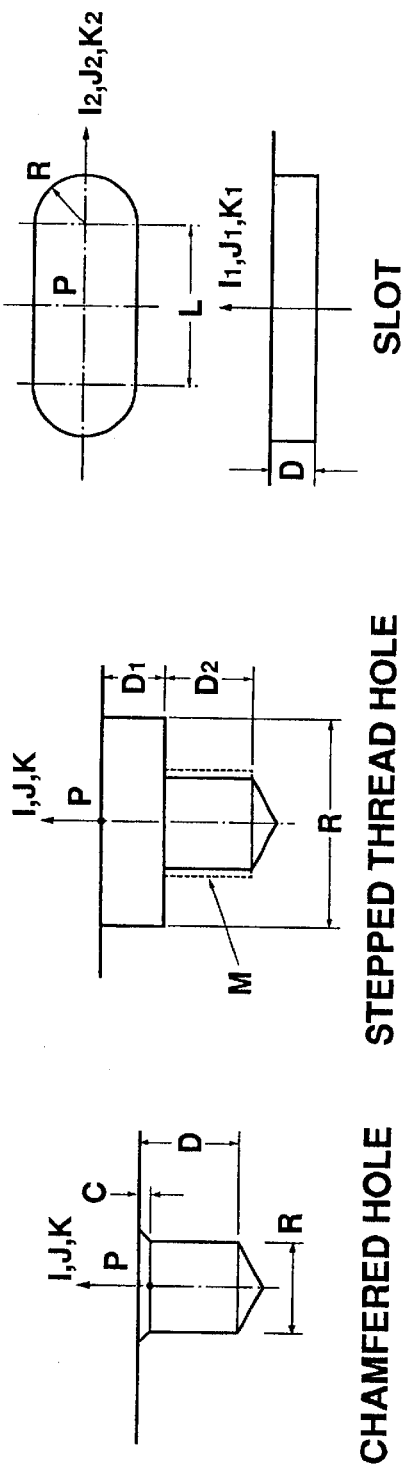
FIG. 15 shows an explanatory geometric element parameter list.

FIG. 15 shows an example of a geometric element parameter list. A chamfering tooled hole, a stepped hole, a stepped threaded hole, a slot, and a circular slot are shown by coordinate values of sizes, and centers P as partially shown in FIG. 15. A geometric element parameter list of the workpiece form is thus generated.

These geometric elements are stored in connection with coordinate systems, which are G54 and G55 in the present embodiment, as a geometric element list shown in FIG. 16. Using this list, the position of a geometric element in the coordinate system can precisely be shown.

Figure 17:
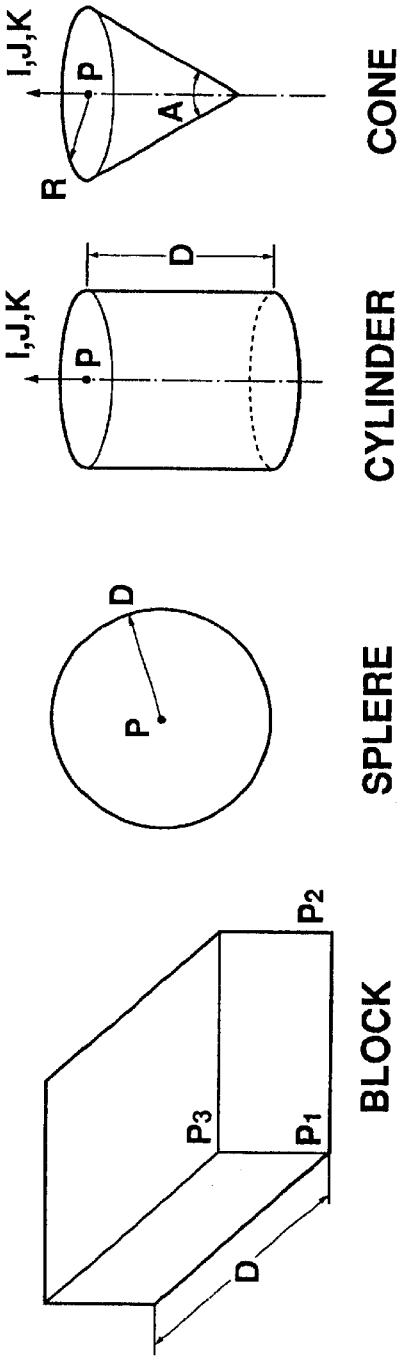
FIG. 17 is an explanatory view showing a CSG primitive library.
Figure 18:
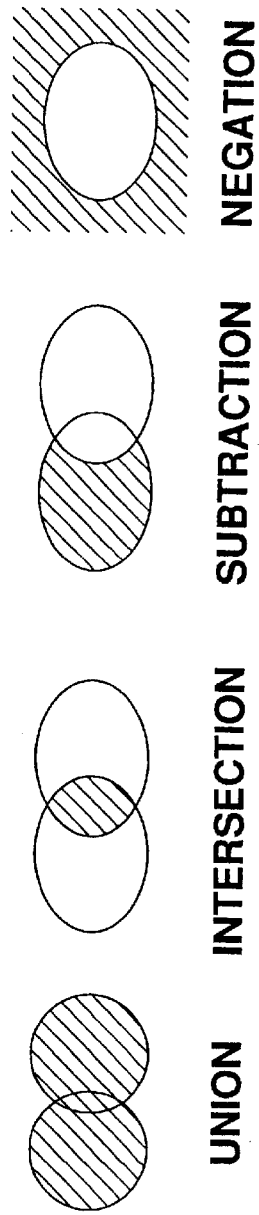
FIG. 18 is an explanatory view showing relationships between the CSG primitives.
Figure 19:
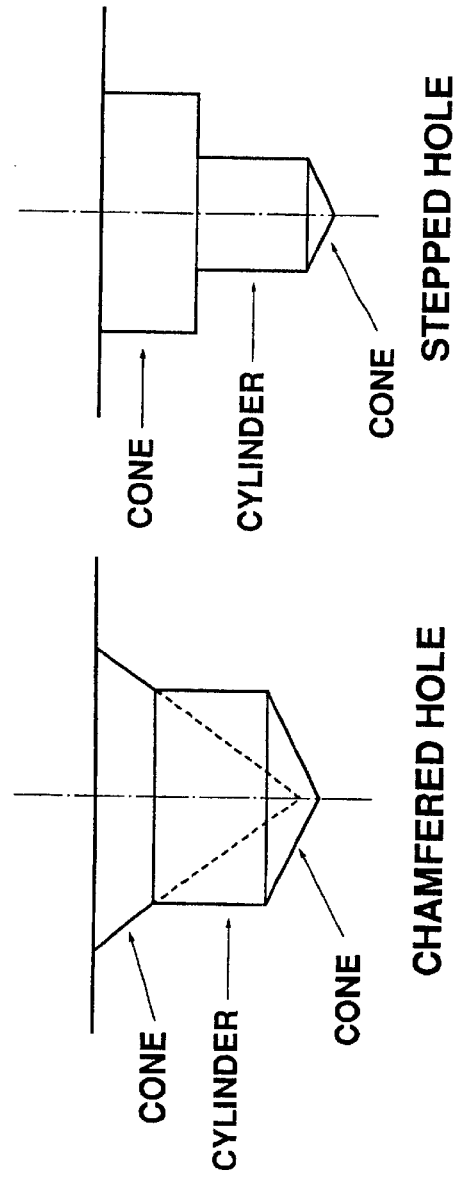
FIG. 19 shows an explanatory view of a geometric element CSG library.

Therefore, using the geometric element list as described above, a measurement program using a predetermined measurement path can be generated. In the embodiment shown by FIG. 2, the geometric element list is converted by the geometric model generation processing unit 45 into a geometric model. In other words, the geometric element list can be expressed by using a CSG (Constructive Solid Geometry) primitive library or the like which is easier to handle using a computer. An example of such a CSG primitive library is shown in FIG. 17. Relationships between the primitives can be expressed by operators shown in FIG. 18, which are union, intersection, subtraction, and negation. In FIG. 19, an example of geometric elements expressed by the CSG library is shown. For example, a chamfering tooled hole can be expressed using two cones and one cylinder. As shown by FIG. 17, primitives forming the geometric model are composed of simple three dimensional objects such as a block, a sphere, a cylinder, a cone and a pyramid. A form created by a usual machine tool can sufficiently be expressed by such simple primitives. In other words, a plurality of the primitives form a joint part using the operators shown in FIG. 18 and generate a geometric model necessary for measurement.

The operators are defined as:
1. Union: The entire of two primitives or a joint part,
2. Intersection: The common portion of two primitives or a joint part,
3. Subtraction: The portion created by subtraction of one primitive or a joint part from the other, and
4. Negation: The portion excluding one primitive or a joint part.

Determination of a Measurement Path

The geometric element list output from the geometric element generating unit 44 or the geometric model output from the geometric model generation processing unit 45 sequentially contains data regarding a form of each machining element or a form to be created in each process, and geometric elements to be processed. As described earlier, parameters of each geometric element are also extracted in accordance with data regarding the coordinate system to which the geometric elements belong.

Figure 20:
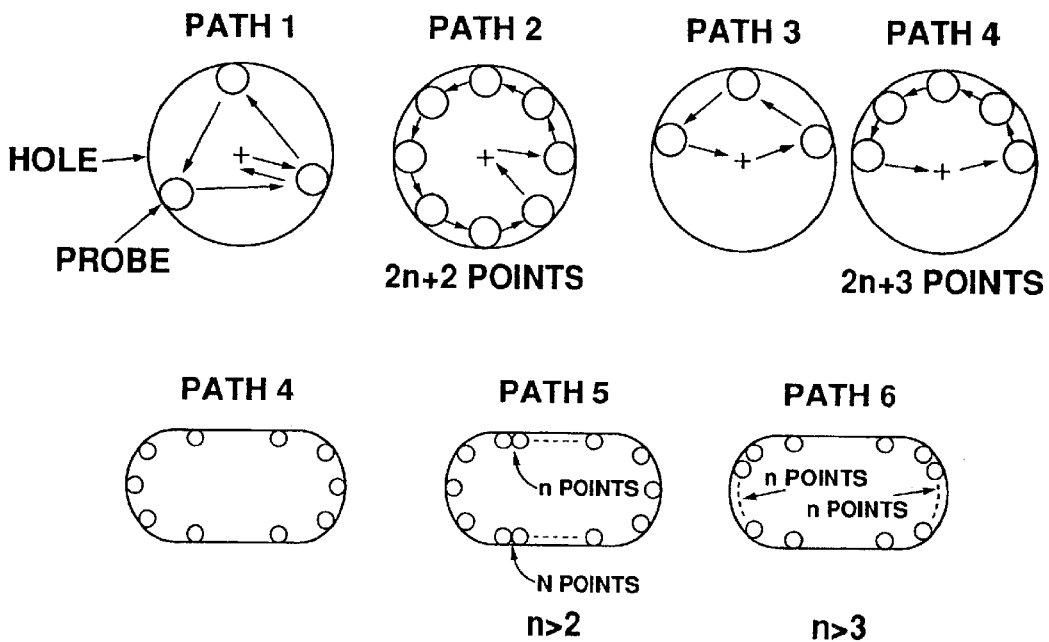
FIG. 20 shows an explanatory view of an element measurement path library.

Based on these data, the measurement program generating unit 36 firstly determines a measurement path. A measurement path in the vicinity of each geometric element is decided referring to a measurement path library shown in FIG. 20.

Figures 21, 22:
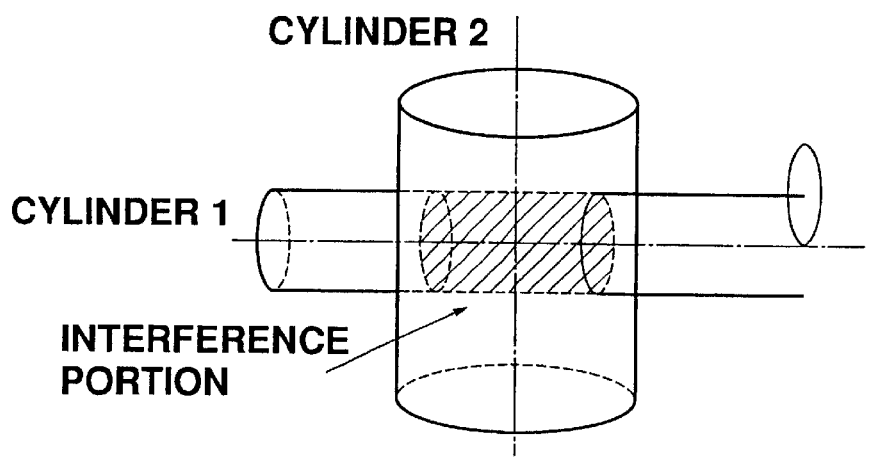
FIG. 21 is an explanatory view showing interference check.
FIG. 22 is a list of interference check shown in FIG. 21.

Upon determination of the measurement path, an interference check is necessary. For example, in the case of a form shown in FIG. 21, two cylinder holes are intersecting. In this intersecting position, an interference portion is created as shown by the hatched areas in FIG. 21. In this interference portion, measurement is not possible. FIG. 22 shows a list of such interference portions. Upon determination of the measurement path, the interference list in FIG. 22 is referred to, and it is preferable to add a measurement point between measurement points excluding the measurement points in the interference portion if interference would actually occur.

Once a measurement path for each geometric element is determined as described above, these measurement paths are connected as a measurement path for the entire workpiece. To connect the measurement paths, either one of the following two methods is usually used.

A first method is to express a probe movement path by geometric elements and to check an interference between the path and a workpiece form. A measurement path without interference is then selected.

Figures 23, 24:
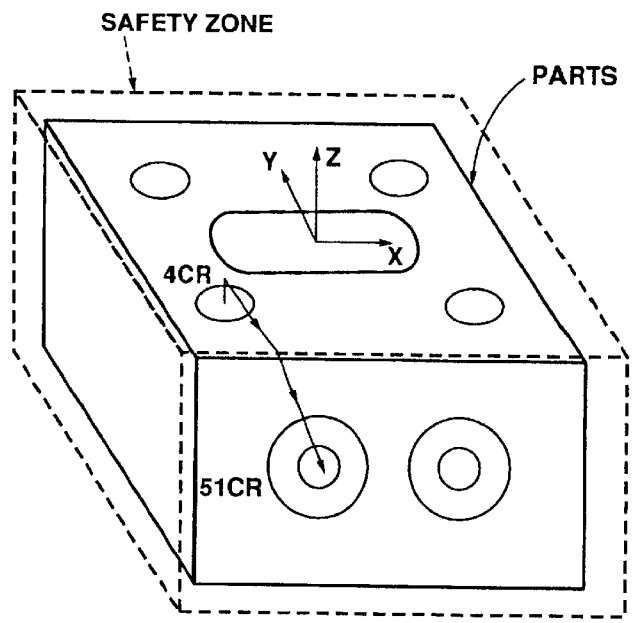
FIG. 23 is an explanatory view of a safety zone to determine a measurement path.
FIG. 24 shows tolerance tables used to make a measurement program.

A second method is, if material data are available, to set a safety zone around a workpiece form as shown by FIG. 23 and move a probe back to the safety zone after measurement of each geometric element. In FIG. 23, if a probe moves from a hole on the upper surface 4CR to a hole on a side 51CR, the probe would collide with the workpiece if it moves in a straight line. Therefore, the probe always moves back to the safety zone, and moves to a subsequent measurement point of the geometric element through the safety zone.

Once the measurement path is determined as described above, the measurement program generating unit 36 generates a measurement program 50 as shown by FIG. 2, referring to the probe information 47, the tolerance information 48, and the other information 49, if necessary. An example of the tolerance information 48 is shown in FIG. 24. The hole tolerances and the size tolerances can be reflected on the measurement program. For example, upon determination of a reference command (a command to compare an nominal value and a measured value), a tolerance of the geometric element is automatically determined by a general tolerance. Using the tolerance determined as described above, the reference command can be determined.

Information necessary other than the tolerance information is listed below:

1. Information Attributed to a Measurement Program
   a. Name of the program
   b. Name of a program file
   c. Measurement result output file name
   d. Measurement result output device
   e. Measurement result output format
   f. Others (process control information or the like)
2. Information Attributed to a Measurement Device
   a. Setting of a datum surface
   b. unit (mm/inch)
   c. Movement and measurement speed
   d. Measurement operation parameter
   e. Probe (measured value) information
   f. Reference information
   g. Others (probe compensation master ball or the like)
3. Information Attributed to an Initial Coordinate System Setting
   a. Switching between automatic and manual measurements
   b. Calling of a coordinate system The above information is not included in an NC program used in the present invention. Therefore, an operator usually inputs the information in advance. It is not necessary to input initial values regarding a measurement device, since they are pre-set. If desired values are different from the initial values, it is possible to easily input the initial values by selecting a template among templates prepared in advance and having initial values.

According to the present invention, the measurement program 50 can easily be generated by analyzing the NC program 40 as described above. FIGS. 25A through 25F show an example of a measurement program generated by the measurement program generating method of the present embodiment.

The workpiece form information extracting unit 34, the geometric model generating unit 35, and the measurement program generating unit 36 shown in FIG. 1 are composed of programs in a medium storing their procedures. Such medium is provided in a form of a floppy disc, a CD-ROM, a hard disc, or a ROM.

Machining Management

The present invention is characterized in that a measurement program is generated by an NC program as described above so that a measurement program which is closely related to actual machining can be obtained. Moreover, while the measurement program is measuring a workpiece form being machined, the measurement result is fed back to machining management of a machine tool so that a relationship with the NC machining program can be strengthened.

Figure 26:
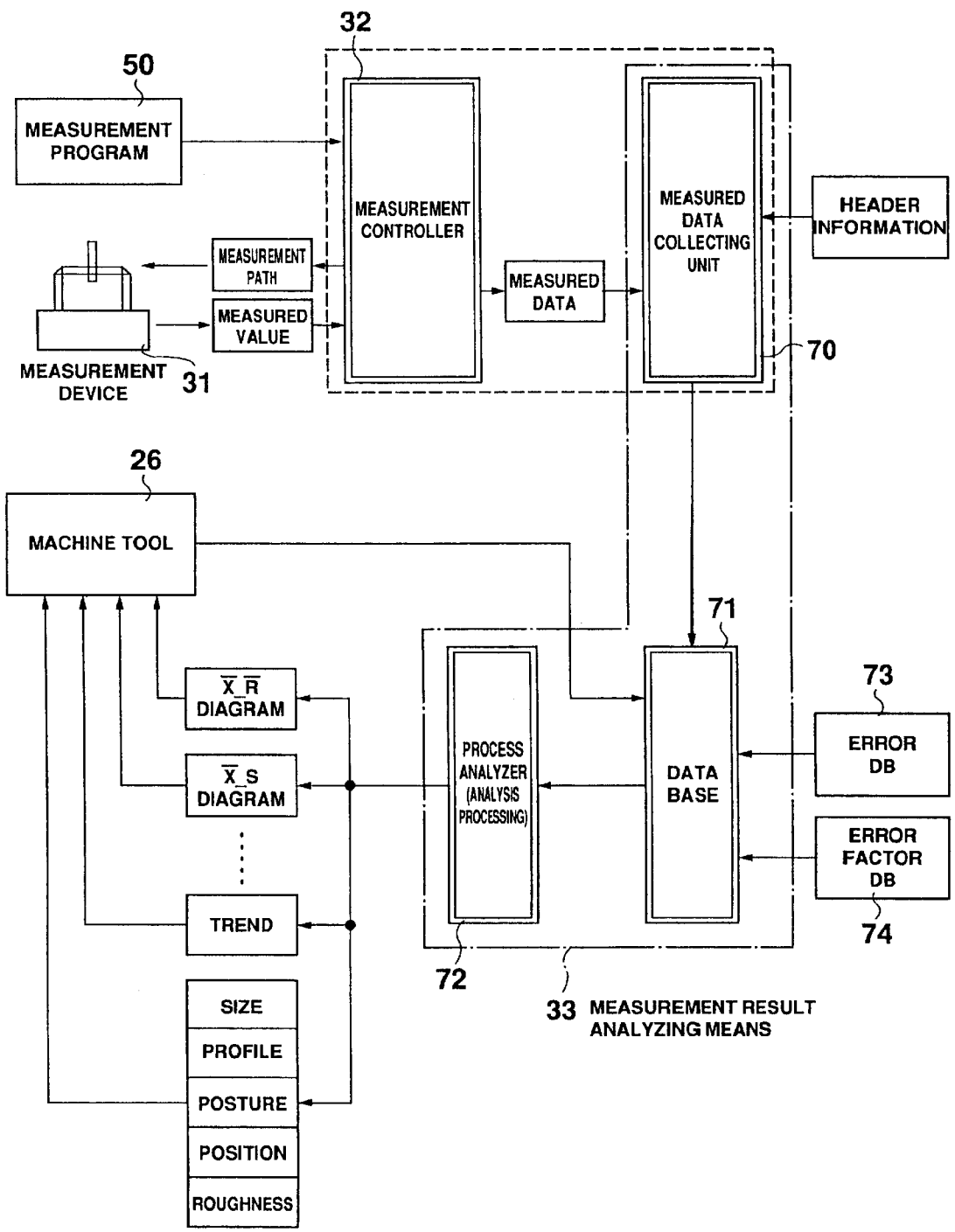
FIG. 26 is an explanatory diagram showing measurement program execution and measurement result analysis related to the present invention.

FIG. 26 shows a state in which the measurement controller 32 is controlling the measurement machine 31, using the measurement program 50. The measurement controller 32 provides a measurement path defined by the predetermined measurement program to the probe of the measurement machine 31. The probe automatically measures the workpiece form in an arbitrary step. The measured values are sent as measurement data from the measurement controller 32 to a measurement data collecting unit 70. In the measurement data collecting unit 70, desired header information is added to the measurement result, and the data are stored in a data base 71 together with the header information. The measurement result analyzing means 33 comprises the measurement data collecting unit 70, the data base 71 and a process analyzer 72. The analysis result is fed back to the machine tool 26 so that the measurement result can be reflected on the following machining process.

Figure 27:
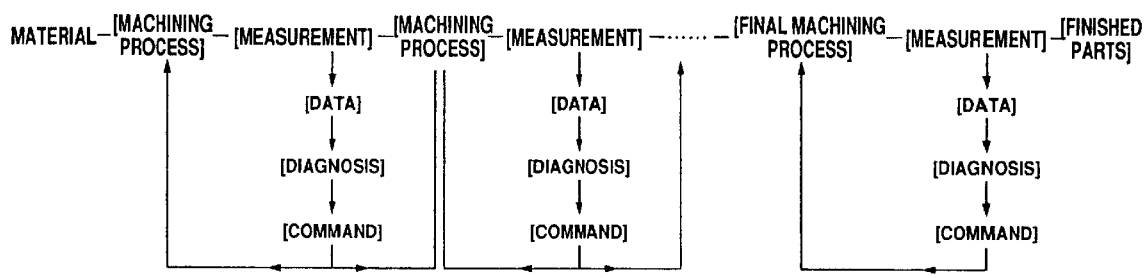
FIG. 27 shows a flow of measurement data shown in FIG. 26.

FIG. 27 shows a flow of measurement results in each process. In the present embodiment, the measurement operation is carried out for any selected machining process. The obtained measurement data are immediately diagnosed by the process analyzer 72, and the diagnosis result is then fed back to machining management in a subsequent machining process or in all of the machining processes if necessary.

Now, returning to FIG. 26, a more detailed explanation will be provided below.

The measurement controller 32 immediately notifies the machine tool 26 of a measurement data error if the measurement result from the measurement machine 31 shows a result beyond tolerance or in a out-of-control zone. The measurement controller 32 commands suspension of machining or a change in the amount of residual stock removal in a subsequent machining step.

The measurement controller 32 sends normal measurement data to the measurement data collecting unit 70 adding the following header information to the measurement data:

1. Information Attributed to a Header
   a. Name of a header
   b. Header file name
   c. Date (date of header generation)
   d. Name of parts
   e. Unit
   f. The number of measurement items
2. Information Attributed to a Measurement Item
   a. Name of the measurement item
   b. Name of a feature
   c. Value
   d. Upper tolerance
   e. Lower tolerance
   f. UCL (Upper Control Limit)
   g. LCL (Lower Control Limit)
3. Information Attributed to a Machining Process
   a. Factors of errors
   b. Limit of error
   c. Relationship between errors
   d. Environmental temperature The process analyzer 72 performs statistics, analysis, and diagnosis using the measured data accumulated in the data base 71. The process analyzer 72 generates management diagrams such as an $\overline{X}$-R diagram, an $\overline{X}$-S diagram, or a trend diagram, and notifies the machine tool 26 of the result.

Figure 28:
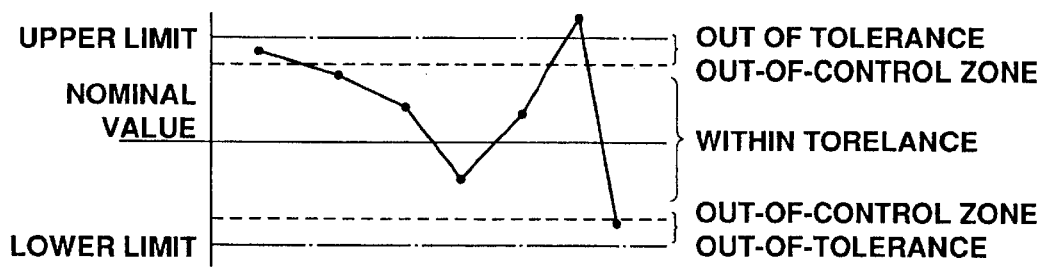
FIG. 28 shows an exemplary result of the measurement.

FIG. 28 is a graph showing a relationship between measured values and nominal values. If a measured value is greater than the upper limit or smaller than the lower limit, it is immediately notified to the machine tool 26 as a value in a out-of-control zone which is out of the tolerance. A value in a range close to the tolerance limit is also notified as a value in the out-of-control zone to a subsequent machining process or an immediately preceding machining process check.

According to the present invention, it is possible to obtain a measurement result in real time during machining.

Therefore, the result is immediately sent to a subsequent machining process and reflected in machine tool feeding in the following process, for example.

The management data obtained by the process analyzer 62 are analyzed by a known diagnosis program such as FMEA (Failure Mode and Effect Analysis) or FTA (Failure Tree Analysis). These diagnosis programs can improve accuracy by sequentially learning modification of the machining program and the measurement program in the present invention. Moreover, as is obvious from FIG. 32, it is possible to collect data in time series regarding main power from motion dynamics of the machine tool 26, and perform spectrum analysis of the data using FFT (Fast Fourier Transform) or other hardware to obtain numerical values of high frequency components of a waveform and calculate their variances. It is also possible to judge roughness of the surface measured and size measurement result, as well as degradation of tool sharpness, tool wear, a deficiency in workpiece attachment, and a machining error. It is preferable to incorporate the judgment into the diagnosis program such as FTA in the process analyzer.

Furthermore, as is obvious from FIG. 32, information regarding a state of the machine tool 26 is provided to the data base 71. A variety of error data from an error data base 73 or error factor diagnosis programs from error factor data base 74 are also provided to the database 71. Using such information, the process analyzer 72 can provide not only the analysis information described above but also form elements such as size, profile, posture, position, and roughness to the machine tool 26. Therefore, the machine tool 26 can perform optimal machining control in a subsequent step, based on such management data.

In the present invention, the programs in the measured data collecting unit 70, the data base 71, and the process analyzer 72 shown in FIG. 26 can store the procedure above in a storing medium, and so do the error data base 73, the error factor data base 74, and the measurement controller 32, if necessary. The storing medium can be provided in the form of a floppy disc, a CD-ROM, a hard disc, and a ROM.

Advantageous Results of the Invention

According to the present invention described above, in NC machining, a measurement program can be directly generated from an actual machining NC program. Therefore, it becomes possible to easily obtain an optimal, detailed measurement result in any machining step.

Furthermore, the measurement program of the present invention can be generated regardless of an NC program size and without a conventional, complex automatic programming. The measurement program is always correlated to an actual NC program, and if one of the programs is modified, the modification can be reflected in the other programs. Therefore, it becomes possible to support machining management using a link between the machining program and the measurement program.

Moreover, the measurement program in the present invention can function in the same manner not only for machine tools on which an NC program is applied but also other machine tools. Also, a measurement program with extremely high generality can be generated, since each measurement program is generated as a module assembly of measurement programs in an arbitrary step for an operation element, machining element, or a machining process. The measurement program can always obtain up-to-date know-how which is necessary for the measurement. By retaining the measurement obtained in such a manner, the measurement program can be applicable to other machine tools, which leads to an advantage in superior generality and wide extensibility.

The measurement result obtained by carrying out the measurement program related to the present invention can always be reflected in subsequent or preceding steps in a machining process, and extremely superior measured values as machining management data can thus be provided.

While there has been described what is at present considered to be a preferred embodiment of the invention, it will be understood that various modifications may be made thereto, and it is intended that the appended claims cover all such modifications as fall within the true spirit and sadapt of the invention.

What is claimed is:

1. A measurement program generating device used in NC machining, wherein machining control is carried out by an NC program that includes at least one of an operation element machining, a machining element machining and a machining process machining comprising at least one step, the measurement program generating device comprising:

a workpiece form information extracting unit for analyzing the NC program and thereby extracting workpiece form information in any step of any one of operation element machining, machining element machining, or machining process machining;

a geometric model generating unit for generating a geometric model in any step, based on the workpiece form information; and a measurement program generating unit for generating a measurement program based on the geometric model.

2. A machining management device used in NC machining and carrying out the measurement program described in claim 1, which further comprises measurement result analyzing means for using the measurement result as machining control information, the result being obtained by carrying out the measurement program at the end of at least one machining process among machining processes in the NC program.

3. A measurement program generating device used in NC machining wherein machining control is carried out by an NC program, comprising:

a dividing unit for dividing a program into operation element machining or machining element machining through analysis of the NC program;

a machining element extracting and coordinate system transforming unit for extracting workpiece form information in the divided operation element machining or machining element machining;

a geometric model generating unit for generating a geometric model in a three dimensional coordinate system, based on the workpiece form information;

a measurement path generating unit for determining a measurement path, based on the geometric model; and a measurement program generating unit for generating a measurement program, based on the measurement path.

4. A measurement program generating method used in NC machining, wherein machining control is carried out by an NC program that includes at least one of an operation element machining, a machining element machining and a machining process machining comprising at least one step, the measurement program generating method comprising:

extracting workpiece form information in any step of any one of operation element machining, machining element machining, or machining process machining through analysis of the NC program;

generating a geometric model in any step, based on the workpiece form information; and generating a measurement program based o the geometric model.

5. A machining management method used in NC machining and carrying out the measurement program described in claim 4, wherein the measurement program is carried out at the end of at least one machining process among machining processes in the NC program and the measurement result is used as machining control information.

6. The machining management method according to claim 5 wherein a form model in the machining process is generated based on the measurement result and provided to a subsequent machining process as machining control information.

7. A measurement program generating method wherein tolerance data are added to the measurement program used in claim 5.

8. A measurement program generating method used in NC machining wherein machining control is carried out by an NC program, comprising the steps of:

- division of the program into operation element machining or machining element machining, through analysis of the NC program;
- extraction of workpiece form information in the divided operation element machining or machining element machining;
- generation of a geometric model in a three dimensional coordinate system, based on the workpiece form information;
- determination of a measurement path, based on the geometric model; and
- generation of a measurement program, based on the measurement path.

9. A medium storing a program for making a computer carry out a procedure for extracting workpiece form information of any one step of an operation element machining, machining element machining, or machining process machining through analysis of an NC program, wherein the NC program comprises zero, one or more of an operation element machining, machining element machining or machining process machining comprising at least one step, the program comprising:

- a procedure for generating a geometric model in any step, based on the workpiece form information; and
- a procedure for generating a measurement program based on the geometric model.

10. A medium storing a program for making a computer carry out procedures using a measurement result obtained by a generated measurement program as a machining control method used in NC machining that includes at least one of an operation element machining, a machining element machining and a machining process machining comprising at least one step, wherein machining control is carried out by an NC program, the program comprising:

- a procedure for extracting workpiece form information in any step of any one of an operation element machining, machining element machining or machining process machining through analysis of the NC program;
- a procedure for generating a geometric model in any step, based on the workpiece form information; and
- a procedure for generating a measurement program based on the geometric model.

* * * * *